US012634266B2

(12) United States Patent
Danivas et al.

(10) Patent No.: US 12,634,266 B2
(45) Date of Patent: May 19, 2026

(54) SYSTEMS AND METHODS FOR NVME PDU DATA DIGEST OPTIMIZATION

(71) Applicant: Pensando Systems Inc., Milpitas, CA (US)

(72) Inventors: Vishwas Danivas, Santa Clara, CA (US); Ganlin Wu, Palo Alto, CA (US); Murty Subba Rama Chandra Kotha, San Jose, CA (US)

(73) Assignee: Pensando Systems Inc., Milpitas, CA (US)

( * ) Notice: Subject to any disclaimer, the term of this patent is extended or adjusted under 35 U.S.C. 154(b) by 644 days.

(21) Appl. No.: 17/963,949

(22) Filed: Oct. 11, 2022

(65) Prior Publication Data

US 2024/0121226 A1 Apr. 11, 2024

(51) Int. Cl.
*H04L 9/40* (2022.01)
*H04L 1/00* (2006.01)

(52) U.S. Cl.
CPC ........ *H04L 63/0435* (2013.01); *H04L 1/0061* (2013.01); *H04L 63/166* (2013.01)

(58) Field of Classification Search
CPC .. H04L 63/0435; H04L 1/0061; H04L 63/166
See application file for complete search history.

(56) References Cited

U.S. PATENT DOCUMENTS 9,703,981 B1 * 7/2017 Marion ................. H04W 12/06
2008/0125043 A1 * 5/2008 Karmanenko ...... H04W 12/106
455/41.2
2009/0268903 A1 * 10/2009 Bojinov ............. G06F 11/1453
713/189
2016/0337083 A1 * 11/2016 Englert ................. H04L 1/0061
2020/0382329 A1 12/2020 Yuan
2021/0111996 A1 * 4/2021 Pismenny ........... H04L 63/0485

OTHER PUBLICATIONS

Wikipedia, "Adler-32", https://en.wikipedia.org/wiki/Adler-32, downloaded Aug. 31, 2022, 2 pgs.
Wikipedia, "Cyclic redundancy check", https://en.wikipedia.org/wiki/Cyclic_redundancy_check, downloaded Jul. 27, 2022, 12 pgs.
NVM Express, "NVM Express Moves into the Future", (2016), 7 pgs.
Minturn, Dave et al. "Under the Hood with NVMe over Fabrics", Dec. 15, 2015, 47 pgs.
NVM Express, "RDMA Transport Specification", Revision 1.0, May 18, 2021, 16 pgs.
NVM Express, "TCP Transport Specification", Revision 1.0, May 18, 2021, 34 pgs.

* cited by examiner

*Primary Examiner* — Ayoub Alata

(57) ABSTRACT

The throughput of a network appliance can be increased by a circuit that produces an encrypted block and a digest value while requiring only a single read of a data block. Data blocks, including a first data block, are stored in a memory that can be accessed by an ASIC that includes an encryption offload circuit. The ASIC can read the first data block from the memory and the encryption offload circuit can produce a first encrypted block and a first digest value from the first data block. The ASIC can produce a network packet that includes the first encrypted block and a data digest value. The first digest value is used to produce the data digest value, and a single read of the first data block from the memory is performed for producing the first encrypted block and also for calculating the first digest value.

20 Claims, 13 Drawing Sheets

1400

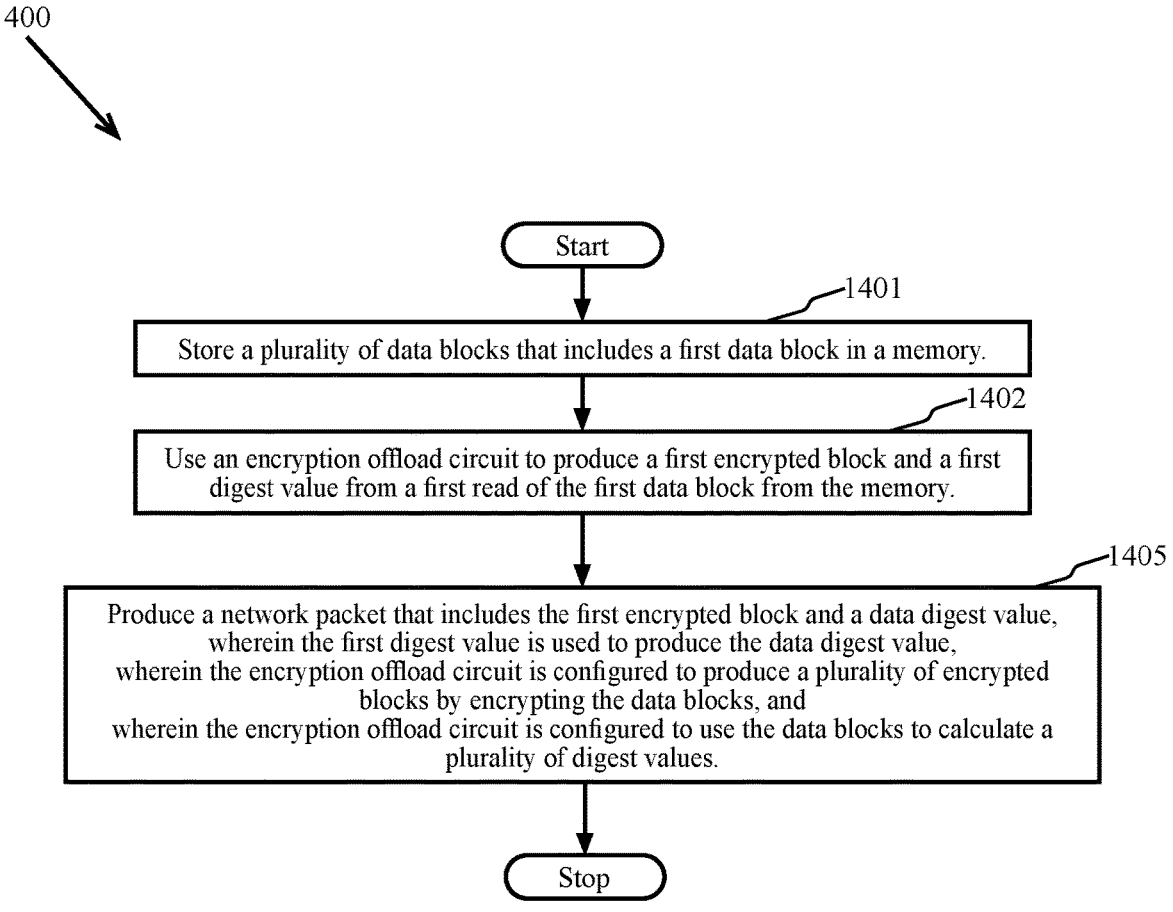

Start

Store a plurality of data blocks that includes a first data block in a memory.    ⌐1401

Use an encryption offload circuit to produce a first encrypted block and a first digest value from a first read of the first data block from the memory.    ⌐1402

Produce a network packet that includes the first encrypted block and a data digest value, wherein the first digest value is used to produce the data digest value, wherein the encryption offload circuit is configured to produce a plurality of encrypted blocks by encrypting the data blocks, and wherein the encryption offload circuit is configured to use the data blocks to calculate a plurality of digest values.    ⌐1405

Stop

FIG. 14

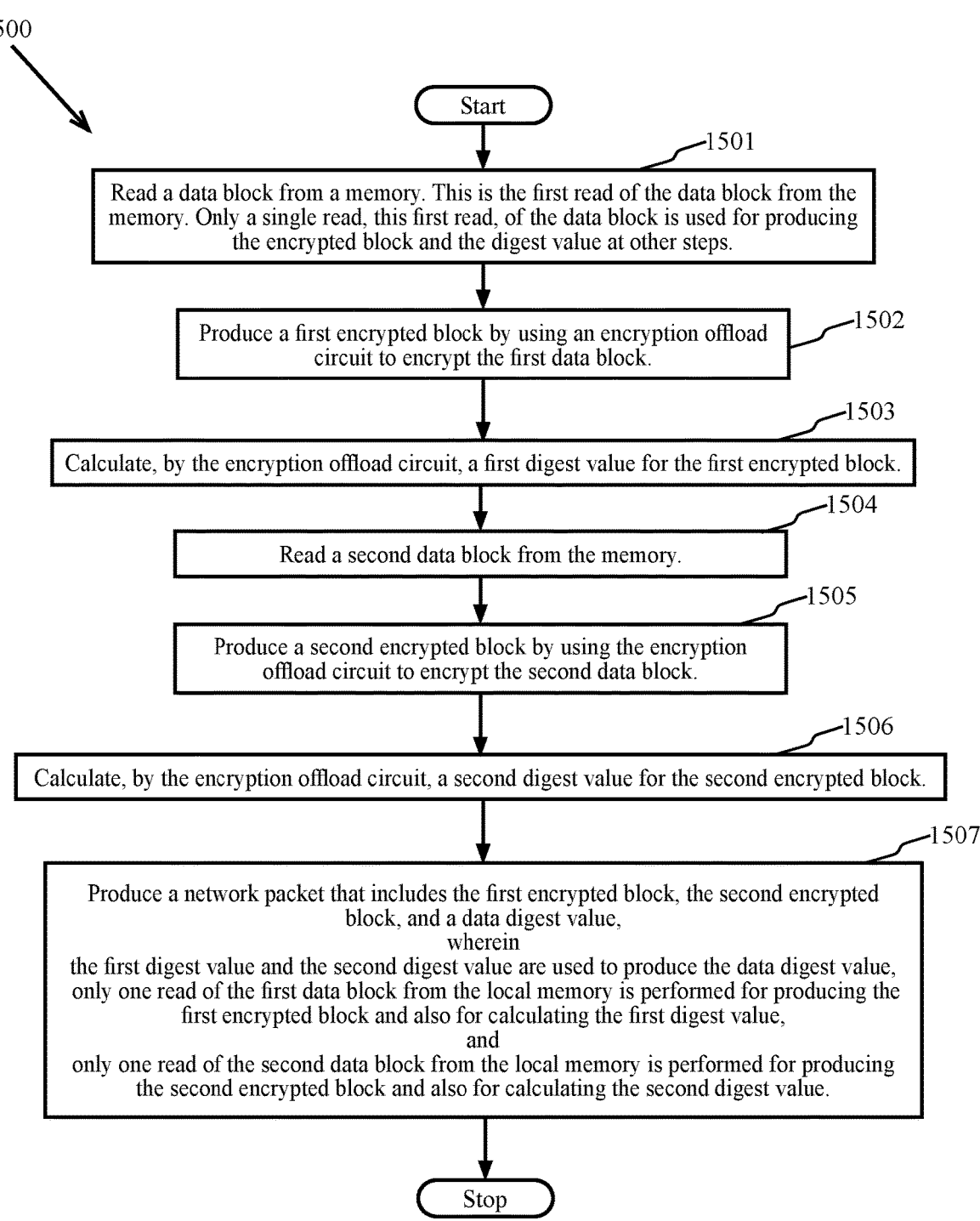

1500

Start

1501
Read a data block from a memory. This is the first read of the data block from the memory. Only a single read, this first read, of the data block is used for producing the encrypted block and the digest value at other steps.

1502
Produce a first encrypted block by using an encryption offload circuit to encrypt the first data block.

1503
Calculate, by the encryption offload circuit, a first digest value for the first encrypted block.

1504
Read a second data block from the memory.

1505
Produce a second encrypted block by using the encryption offload circuit to encrypt the second data block.

1506
Calculate, by the encryption offload circuit, a second digest value for the second encrypted block.

1507
Produce a network packet that includes the first encrypted block, the second encrypted block, and a data digest value,
wherein
the first digest value and the second digest value are used to produce the data digest value,
only one read of the first data block from the local memory is performed for producing the first encrypted block and also for calculating the first digest value,
and
only one read of the second data block from the local memory is performed for producing the second encrypted block and also for calculating the second digest value.

Stop

FIG. 15

SYSTEMS AND METHODS FOR NVME PDU DATA DIGEST OPTIMIZATION

TECHNICAL FIELD

The embodiments relate to computer networks, local area networks, network appliances such a router, a switch, a network interface card (NIC), a smartNIC, and a distributed service card (DSC). The embodiments also relate to elements of network appliances such as an application specific integrated circuit (ASIC), packet processing pipeline circuit, encryption circuit, and digest calculation circuit. The embodiments further relate to non-volatile memory express (NVMe) packet processing pipelines, ASICs implementing packet processing pipeline circuits, to central processing unit (CPU) offload circuits that can encrypt a data block and to CPU offload circuits that can calculate a digest value.

BACKGROUND

Network appliances process network traffic flows by receiving network packets and processing the network packets. The network packets are often processed by examining the packet's header data and applying rules such as routing rules, firewall rules, load balancing rules, etc. Packet processing can be performed by a packet processing pipeline such as a "P4" packet processing pipeline. The concept of a domain-specific language for programming protocol-independent packet processors, known simply as "P4," developed as a way to provide some flexibility at the data plane of a network appliance. The P4 domain-specific language for programming the data plane of network appliances has been defined in the "P4$_{16}$ Language Specification," version 1.2.2, as published by the P4 Language Consortium on May 17, 2021. P4 (also referred to herein as the "P4 specification," the "P4 language," and the "P4 program") is designed to be implementable on a large variety of targets including switches, routers, programmable NICs, software switches, field programmable gate arrays (FPGAs), and application specific integrated circuits (ASICs). As described in the P4 specification, the primary abstractions provided by the P4 language relate to header types, parsers, tables, actions, match-action units, control flow, extern objects, user-defined metadata, and intrinsic metadata. Packet processing pipeline circuits can be considered to be central processing unit (CPU) offloads because they offload work from the CPUs and thereby free the CPUs to perform other tasks. Cryptographic transform circuits, compression circuits, and decompression circuits, are also examples of CPU offloads.

BRIEF SUMMARY OF SOME EXAMPLES

The following presents a summary of one or more aspects of the present disclosure, in order to provide a basic understanding of such aspects. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure as a prelude to the more detailed description that is presented later.

One aspect of the subject matter described in this disclosure can be implemented in a network appliance. The network appliance can include a memory that stores a plurality of data blocks that includes a first data block, and an encryption offload circuit that is capable of producing encrypted blocks and digest values from single reads of the data blocks from the memory, wherein the encryption offload circuit produces a first encrypted block and a first digest value from a first read of the first data block from the memory, wherein the network appliance is configured to produce a network packet that includes the first encrypted block and a data digest value, wherein the first digest value is used to produce the data digest value.

Another aspect of the subject matter described in this disclosure can be implemented by a method. The method can include storing a plurality of data blocks that includes a first data block in a memory, using an encryption offload circuit to produce a first encrypted block and a first digest value from a first read of the first data block from the memory, and producing a network packet that includes the first encrypted block and a data digest value, wherein the first digest value is used to produce the data digest value, wherein the encryption offload circuit is configured to produce a plurality of encrypted blocks by encrypting the data blocks, and wherein the encryption offload circuit is configured to use the encrypted data blocks to calculate a plurality of digest values.

Yet another aspect of the subject matter described in this disclosure can be implemented in a system. The system can include a memory means for storing a plurality of data blocks that includes a first data block, an encryption and digest means for producing a plurality encrypted blocks and a plurality of digest values from the data blocks, a means for using the digest values to produce a data digest value, and a means for producing a network packet that includes at least one of the encrypted blocks and the data digest value, wherein the encryption and digest means is configured to produce a first encrypted block and a first digest value from a single read of the first data block from the memory means.

In some implementations of the methods and devices, the network appliance further includes a semiconductor chip that includes a memory interface, the encryption offload circuit, and an on-chip communications fabric, wherein the memory can be outside of the semiconductor chip, wherein the memory interface can be configured to read from and write to the memory, wherein the on-chip communications fabric communicatively connects the memory interface with the encryption offload circuit, wherein the semiconductor chip receives the first data block from the memory via the memory interface, and wherein the encryption offload circuit receives the first data block via the on-chip communications fabric. In some implementations of the methods and devices, a network interface card (NIC) includes the encryption offload circuit and the memory, the NIC is installed in a host computer that includes a host memory, and the NIC uses a peripheral component interface express (PCIe) bus to transfer the first data block from the host memory to the memory. In some implementations of the methods and devices, the network appliance further includes a packet processing pipeline circuit that commands the encryption offload circuit to encrypt the first data block.

In some implementations of the methods and devices, the network packet includes a Non-Volatile Memory Express (NVMe) protocol data unit (PDU), a PDU data field of the NVMe PDU includes the first encrypted block, and a data digest field of the NVMe PDU includes the data digest value. In some implementations of the methods and devices, the network packet is an internet protocol (IP) packet that encapsulates a transmission control protocol (TCP) packet, and the NVMe PDU is a NVMe/TCP PDU that is included in a TCP payload of the TCP packet. In some implementations of the methods and devices, the network packet is an IP packet that encapsulates a TCP packet that includes a TCP payload, the TCP payload includes a NVMe/TCP PDU that has a PDU data field and a data digest field, the PDU data field includes the first encrypted block, and the data digest field includes the data digest value. In some implementations of the methods and devices, the network packet is an IP packet that includes an IP payload, the IP payload includes a NVMe/TCP PDU that has a PDU data field and a data digest field, the PDU data field includes the first encrypted block, and the data digest field includes the data digest value.

In some implementations of the methods and devices, the plurality of data blocks includes a second data block, a second encrypted block and a second digest value are produced by the encryption offload circuit using a single read of the second data block from the memory, the network packet includes the second encrypted block, and the first digest value and the second digest value are used to produce the data digest value. In some implementations of the methods and devices, the first digest value is a first cyclic redundancy check (CRC) value, the second digest value is a second CRC value, and an exclusive or (XOR) circuit uses the first CRC value and the second CRC value to produce the data digest value. In some implementations of the methods and devices, the first digest value is a first cyclic redundancy check (CRC) value, the second digest value is a second CRC value, and a checksum circuit uses the first CRC value and the second CRC value to produce the data digest value.

In some implementations of the methods and devices, the first digest value is a first cyclic redundancy check (CRC) value, the second digest value is a second CRC value, and a summation circuit uses the first CRC value and the second CRC value to produce the data digest value. In some implementations of the methods and devices, the first digest value is a first cyclic redundancy check (CRC) value, the second digest value is a second CRC value, and an Adler-32 circuit uses the first CRC value and the second CRC value to produce the data digest value. In some implementations of the methods and devices, the first digest value is a first cyclic redundancy check (CRC) value, the second digest value is a second CRC value, and a CRC circuit produces the data digest value by using the first CRC value and the second CRC value as inputs.

In some implementations of the methods and devices, the network appliance further includes a semiconductor chip that includes the encryption offload circuit, a memory interface, a packet processing pipeline circuit, and an on-chip communications fabric, wherein the memory is outside of the semiconductor chip, the memory interface is configured to read from and write to the memory, the on-chip communications fabric communicatively connects the memory interface with the encryption offload circuit, the semiconductor chip receives the first data block from the memory via the memory interface, the encryption offload circuit receives the first data block via the on-chip communications fabric, a NIC includes the semiconductor chip and the memory, the NIC is installed in a host computer that includes a host memory, the NIC uses a PCIe bus to transfer the first data block from the host memory to the memory, the packet processing pipeline circuit commands the encryption offload circuit to encrypt the first data block, the network packet includes a NVMe PDU, a PDU data field of the NVMe PDU includes the first encrypted block, a data digest field of the NVMe PDU includes the data digest value, the network packet is an IP packet that encapsulates a TCP packet that includes a TCP payload, and the NVMe PDU is a NVMe/TCP PDU that is included in the TCP payload.

In some implementations of the methods and devices, the plurality of data blocks includes a second data block, the encryption offload circuit produces a second encrypted block and a second digest value from a first read of the second data block from the memory, the network packet includes the second encrypted block, and the first digest value and the second digest value are used to produce the data digest value.

These and other aspects will become more fully understood upon a review of the detailed description, which follows. Other aspects, features, and embodiments will become apparent to those of ordinary skill in the art, upon reviewing the following description of specific, exemplary embodiments in conjunction with the accompanying figures. While features may be discussed relative to certain embodiments and figures below, all embodiments can include one or more of the advantageous features discussed herein. In other words, while one or more embodiments may be discussed as having certain advantageous features, one or more of such features may also be used in accordance with the various embodiments discussed herein. In similar fashion, while exemplary embodiments may be discussed below as device, system, or method embodiments such exemplary embodiments can be implemented in various devices, systems, and methods.

BRIEF DESCRIPTION OF THE DRAWINGS

FIG. 14 is a high-level flow diagram illustrating a method for NVMe PDU data digest optimization according to some aspects.

FIG. 15 is a high-level flow diagram illustrating a method for producing a network packet carrying an NVMe PDU that includes two encrypted blocks according to some aspects.

Throughout the description, similar reference numbers may be used to identify similar elements.

DETAILED DESCRIPTION

Figure 1:
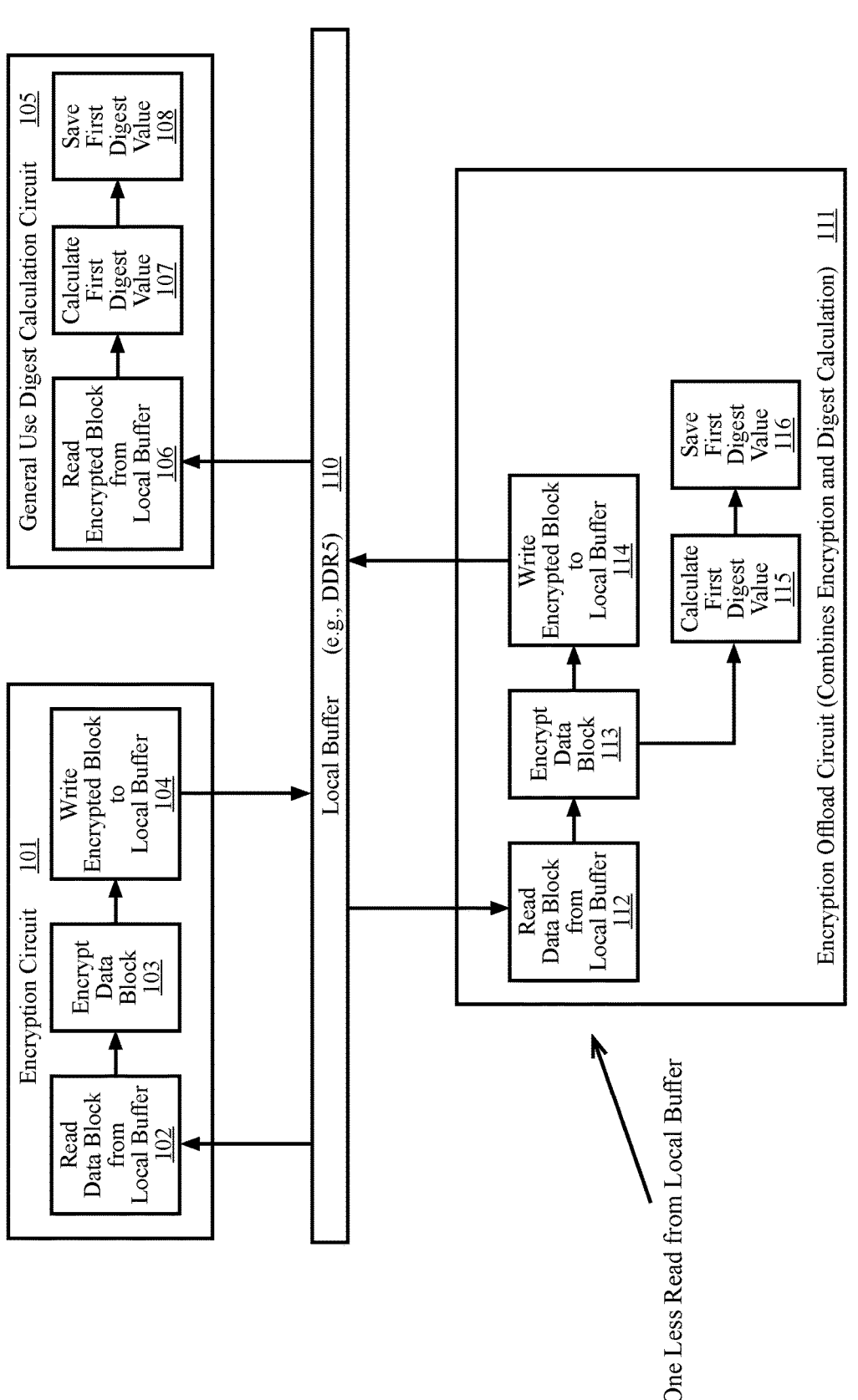
FIG. 1 is a high-level conceptual diagram illustrating an encryption offload circuit using one less read operation than an encryption circuit and a separate general use digest calculation circuit according to some aspects.

It will be readily understood that the components of the embodiments as generally described herein and illustrated in the appended figures could be arranged and designed in a wide variety of different configurations. Thus, the following more detailed description of various examples, as represented in the figures, is not intended to limit the scope of the present disclosure, but is merely representative of various embodiments. While the various aspects of the embodiments are presented in drawings, the drawings are not necessarily drawn to scale unless specifically indicated.

Systems and methods that implement aspects of the embodiments may have various differing forms. The described systems and methods are to be considered in all respects only as illustrative and not restrictive. The scope of the claims is, therefore, indicated by the claims themselves rather than by this detailed description. All changes which come within the meaning and range of equivalency of the claims are to be embraced within their scope.

Reference throughout this specification to features, advantages, or similar language does not imply that any system or method implements each and every aspect that may be realized. Rather, language referring to the features and advantages is understood to mean that a specific feature, advantage, or characteristic described in an example may be implemented in or by at least one embodiment. Thus, discussions of the features and advantages, and similar language, throughout this specification may, but do not necessarily, refer to the same embodiment.

Furthermore, the described features, advantages, characteristics, and aspects may be combined in any suitable manner in one or more systems or methods. One skilled in the relevant art will recognize, in light of the description herein, that an embodiment can be practiced without one or more of the specific features or advantages of another embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment. Thus, the phrases "in one embodiment", "in an embodiment", and similar language throughout this specification may, but do not necessarily, all refer to the same embodiment.

Computer networks share information by exchanging network packets that use standardized protocols at various protocol layers. Many network packets include digest values that can be used to check for corrupted packets or packet payloads. For example, the frame check sequence (FCS) of Ethernet packets is a digest value that can be calculated by a cyclic redundancy check (CRC) algorithm or CRC calculation circuit. In fact, it is common for networking hardware to include a general use CRC calculation circuit for the purpose of calculating Ethernet FCS values.

For security, many network packets have encrypted payloads. For example, an NVMe protocol data unit (PDU) is a layer 7 packet that is commonly encapsulated in a transmission protocol (TCP) packet. Such an encapsulation may be called NVMe/TCP or NVMe over TCP. An NVMe PDU includes a data field and a digest field. The data field carries a block of data that is the payload of the NVMe PDU. The digest value in the digest field can be a CRC value calculated from the payload. Computers can use NVMe/TCP to access remote storage. As such, the payloads are often encrypted. Encrypted NVMe PDU payloads are often a requirement within large data centers that may have tens of thousands of servers running hundreds of thousands of workloads (e.g., virtual machines, containerized applications, etc.). The non-volatile storage used by the workloads can be held by storage area networks that may concurrently serve the vast number of workloads in the data center. The network in the data center carries a vast number of NVMe PDUs. Considerable resources are consumed by encrypting the payloads of those NVMe PDUs and for calculating the digests of those encrypted payloads.

Networking hardware can include a memory that stores data blocks and specialized circuits for performing specific tasks such as an encryption circuit, a CRC calculation circuit, a packet processing pipeline circuit, etc. The encryption circuit can read a data block from the memory, encrypt the data block to produce an encrypted block, and write the encrypted block back to the memory. The CRC calculation circuit may be a general use CRC calculation circuit that can read data blocks (e.g., the encrypted block) from memory, calculate the digest values for the data blocks, and store the digest values. As such, the general use CRC calculation circuit can calculate a CRC value that can be the digest value for an NVMe PDU that carries the encrypted block. Producing the NVMe PDU has consumed a first read of the data block, one write of the encrypted block, and a read of the encrypted block. The memory bandwidth is a critical resource within the network appliance and may limit the throughput of the network hardware.

Less memory bandwidth is consumed when an encryption offload circuit is used instead of the encryption circuit and the general use CRC calculation circuit. The encryption offload circuit can include the encryption circuit and can also include a dedicated CRC calculation circuit. As such, encryption offload circuit can read the data block from memory, encrypt the data block and calculate the digest value, then write out the encrypted block back and store the digest value. Here, producing the NVMe PDU has consumed one read, the first read, of the data block, and one write of the encrypted block. A read of the encrypted block for producing the digest value is not required and is therefore not performed. A single read of data block, in encrypted or unencrypted form, has been performed in order to obtain both the encrypted block and the digest value. Advantages of using the encryption offload circuit include preserving memory bandwidth, freeing up the general use CRC calculation circuit for other purposes such as calculating Ethernet FCS values, and increasing the throughput of the networking hardware.

In the field of data networking, the functionality of network appliances such as switches, routers, and NICs are often described in terms of functionality that is associated with a "control plane" and functionality that is associated with a "data plane." In general, the control plane refers to components and/or operations that are involved in managing forwarding information and the data plane refers to components and/or operations that are involved in forwarding packets from an input interface to an output interface according to the forwarding information provided by the control plane. The data plane may also refer to components and/or operations that implement packet processing operations related to encryption, decryption, compression, decompression, firewalling, and telemetry.

Aspects described herein process packets using match-action pipelines. A match-action pipeline is a part of the data plane that can process network traffic flows extremely quickly if the match-action pipeline is configured to process those traffic flows. Upon receiving a packet of a network traffic flow, the match-action pipeline can generate an index from data in the packet header. Finding a flow table entry for the network traffic flow at the index location in the flow table is the "match" portion of "match-action". If there is a "match", the "action" is performed to thereby process the packet. If there is no flow table entry for the network traffic flow, it is a new network traffic flow that the match-action pipeline is not yet configured to process. If there is no match, then the match-action pipeline can perform a default action.

The high-volume and rapid decision-making that occurs at the data plane is often implemented in one or more semiconductor chips. An application specific integrated circuit (ASIC) and a field programmable gate array (FPGA) are examples of such semiconductor chips. A semiconductor chip such as a fixed function ASIC may enable high-volume and rapid packet processing. However, a fixed function ASIC typically does not provide enough flexibility to adapt to changing needs. Data plane processing implemented in FPGAs may provide a high level of flexibility in data plane processing.

FIG. 1 is a high-level conceptual diagram illustrating an encryption offload circuit 111 using one less read operation than an encryption circuit 101 and a general use digest calculation circuit 105 according to some aspects. A direct data write version 5 (DDR5) memory can be the local buffer 110 of a networking appliance. The local buffer 110 can store data blocks that are to be processed by the network appliance. The encryption circuit 101 can read a data block 102, encrypt the data block 103, and write the data block 104 back to the local buffer 110 as an encrypted block. The general use digest calculation circuit 105 can read the encrypted block 106, calculate a digest value 107 (e.g., a CRC-32 value) for the encrypted block, and store the digest value 108. The encryption circuit 101 and the general use digest calculation circuit 105 required one read of the data block, one write of the encrypted block, and one read of the encrypted block, which is two reads and one write of entire data blocks.

The encryption offload circuit 111 can read a data block 112, encrypt the data block 113, and write the data block 114 back to the local buffer 110 as an encrypted block, calculate a digest value 115, for the encrypted block, and store the digest value 116. The encryption offload circuit 111 required one read of the data block, and one write of the encrypted block, which is only one read and one write of entire data blocks.

Figure 2:
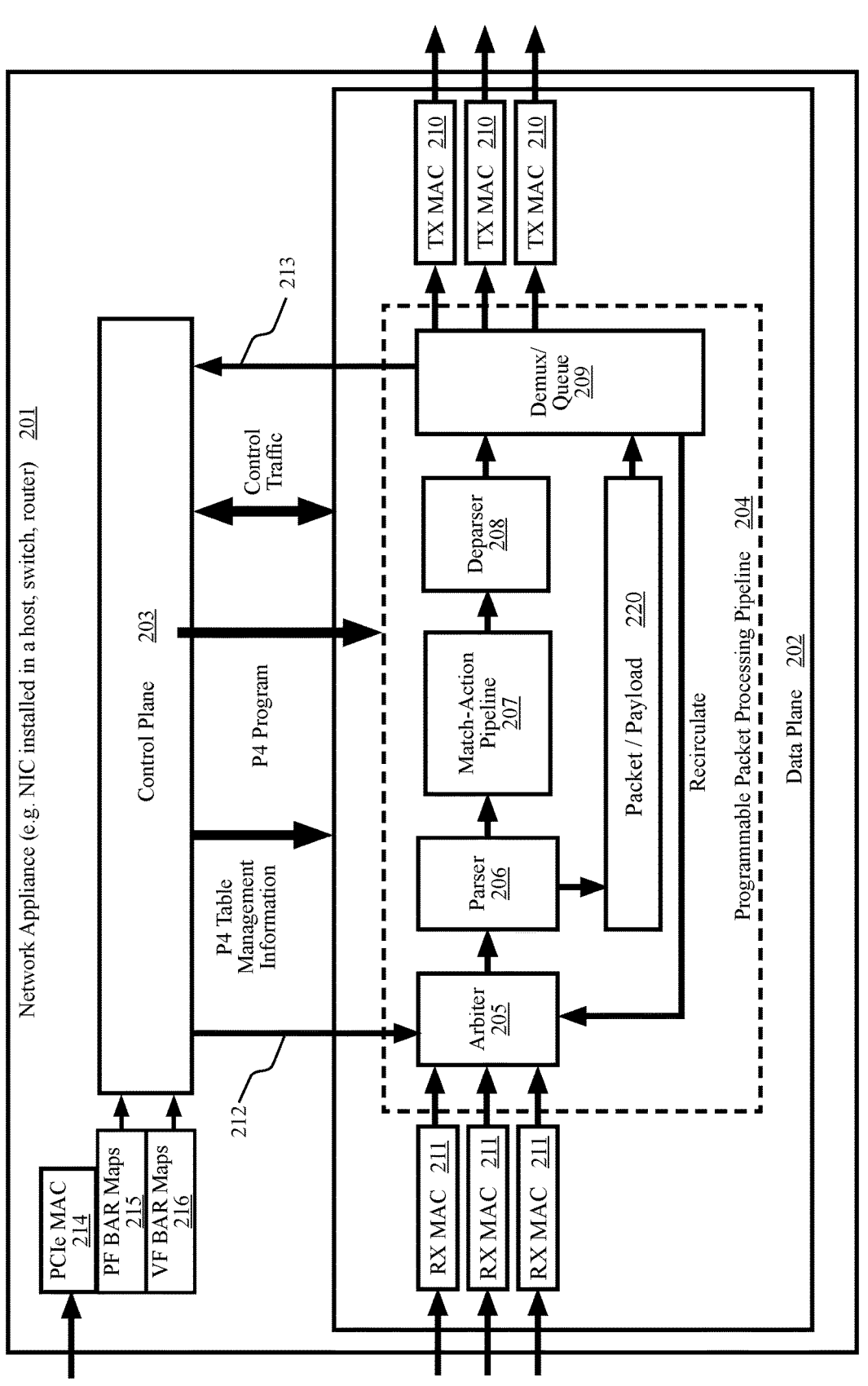
FIG. 2 is a functional block diagram of a network appliance having a control plane and a data plane and in which aspects may be implemented.

FIG. 2 is a functional block diagram of a network appliance having a control plane and a data plane and in which aspects may be implemented. A network appliance 201 can have a control plane 203 and a data plane 202. The control plane provides forwarding information (e.g., in the form of table management information or configuration data) to the data plane and the data plane receives packets on input interfaces, processes the received packets, and then forwards packets to desired output interfaces. Additionally, control traffic (e.g., in the form of packets) may be communicated from the data plane to the control plane and/or from the control plane to the data plane. The data plane and control plane are sometimes referred to as the "fast" plane and the "slow" plane, respectively. In general, the control plane is responsible for less frequent and less time-sensitive operations such as updating Forwarding Information Bases (FIBs) and Label Forwarding Information Bases (LFIBs), while the data plane is responsible for a high volume of time-sensitive forwarding decisions that need to be made at a rapid pace. The control plane may implement operations related to packet routing that include InfiniBand channel adapter management functions, Open Shortest Path First (OSPF), Enhanced Interior Gateway Routing Protocol (EIGRP), Border Gateway Protocol (BGP), Intermediate System to Intermediate System (IS-IS), Label Distribution Protocol (LDP), routing tables and/or operations related to packet switching that include Address Resolution Protocol (ARP) and Spanning Tree Protocol (STP). The data plane (which may also be referred to as the "forwarding" plane) may implement operations related to parsing packet headers, Quality of Service (QoS), filtering, encapsulation, queuing, and policing. Although some functions of the control plane and data plane are described, other functions may be implemented in the control plane and/or the data plane.

Some techniques exist for providing flexibility at the data plane of network appliances that are used in data networks. For example, the concept of a domain-specific language for programming protocol-independent packet processors, known simply as "P4," has developed as a way to provide some flexibility at the data plane of a network appliance. The document "P4$_{16}$ Language Specification," version 1.2.2, published by the P4 Language Consortium on May 17, 2021, which is incorporated by reference herein, describes the P4 domain-specific language that can be used for programming the data plane of network appliances. P4 (also referred to herein as the "P4 specification," the "P4 language," and the "P4 program") is designed to be implementable on a large variety of targets including switches, routers, programmable NICs, software switches, FPGAs, and ASICs. As described in the P4 specification, the primary abstractions provided by the P4 language relate to header types, parsers, tables, actions, match-action units, match-action pipeline stages, control flow, extern objects, user-defined metadata, and intrinsic metadata.

The data plane 202 includes multiple receive (RX) media access controllers (MACs) 211 and multiple transmit (TX) MACs 210. The RX MACs 211 implement media access control on incoming packets via, for example, a layer 2 protocol such as Ethernet. The layer 2 protocol can be Ethernet and the RX MACs can be configured to implement operations related to, for example, receiving frames, half-duplex retransmission and back-off functions, Frame Check Sequence (FCS), interframe gap enforcement, discarding malformed frames, and removing the preamble, Start Frame Delimiter (SFD), and padding from a packet. Likewise, the TX MACs 210 implement media access control on outgoing packets via, for example, Ethernet. The TX MACs can be configured to implement operations related to, for example, transmitting frames, half-duplex retransmission and back-off functions, appending an FCS, interframe gap enforcement, and prepending a preamble, an SFD, and padding.

As illustrated in FIG. 2, a P4 program is provided to the data plane 202 via the control plane 203. Communications between the control plane and the data plane can use a dedicated channel or bus, can use shared memory, etc. The P4 program includes software code that configures the functionality of the data plane 202 to implement particular processing and/or forwarding logic and to implement processing and/or forwarding tables that are populated and managed via P4 table management information that is provided to the data plane from the control plane. Control traffic (e.g., in the form of packets) may be communicated from the data plane to the control plane and/or from the control plane to the data plane. In the context of P4, the control plane corresponds to a class of algorithms and the corresponding input and output data that are concerned with the provisioning and configuration of the data plane corresponds to a class of algorithms that describe transformations on packets by packet processing systems.

The data plane 202 includes a programmable packet processing pipeline 204 that is programmable using a domain-specific language such as P4 and that can be used to implement the programmable packet processing pipeline 204. As described in the P4 specification, a programmable packet processing pipeline can include an arbiter 205, a parser 206, a match-action pipeline 207, a deparser 208, and a demux/queue 209. The data plane elements described may be implemented as a P4 programmable switch architecture, as a P4 programmable NIC, as a P4 programmable router, or some other architecture. The arbiter 205 can act as an ingress unit receiving packets from RX MACs 211 and can also receive packets from the control plane via a control plane packet input 212. The arbiter 205 can also receive packets that are recirculated to it by the demux/queue 209. The demux/queue 209 can act as an egress unit and can also be configured to send packets to a drop port (the packets thereby disappear), to the arbiter via recirculation, and to the control plane 203 via an output central processing unit (CPU) port 213. The control plane is often referred to as a CPU although, in practice, control planes often include multiple CPU cores and other elements. The arbiter 205 and the demux/queue 209 can be configured through the domain-specific language (e.g., P4).

The parser 206 is a programmable element that can be configured through the domain-specific language (e.g., P4) to extract information from a packet (e.g., information from the header of the packet). As described in the P4 specification, parsers describe the permitted sequences of headers within received packets, how to identify those header sequences, and the headers and fields to extract from packets. The information extracted from a packet by the parser can be referred to as a packet header vector (PHV). The parser can identify certain fields of the header and can extract the data corresponding to the identified fields to generate the PHV. The PHV may include other data (often referred to as "metadata") that is related to the packet but not extracted directly from the header, including for example, the port or interface on which the packet arrived at the network appliance. Thus, the PHV may include other packet related data (metadata) such as input/output port number, input/output interface, or other data in addition to information extracted directly from the packet header. The PHV produced by the parser may have any size or length. For example, the PHV may be at least 4 bits, 8 bits, 16 bits, 32 bits, 64 bits, 128 bits, 256 bits, or 512 bits. In some cases, a PHV having even more bits (e.g., 6 Kb) may include all relevant header fields and metadata corresponding to a received packet. The size or length of a PHV corresponding to a packet may vary as the packet passes through the match-action pipeline.

The deparser 208 is a programmable element that is configured through the domain-specific language (e.g., P4) to generate packet headers from PHVs at the output of match-action pipeline 207 and to construct outgoing packets by reassembling the header(s) such as Ethernet headers, internet protocol (IP) headers, InfiniBand protocol data units (PDUs), etc. as determined by the match-action pipeline. In some cases, a packet/payload may travel in a separate queue or buffer 220, such as a first-in-first-out (FIFO) queue, until the packet payload is reassembled with its corresponding PHV at the deparser to form a packet. The deparser may rewrite the original packet according to the PHV fields that have been modified (e.g., added, removed, or updated). In some cases, a packet processed by the parser may be placed in a packet buffer/traffic manager for scheduling and possible replication. In some cases, once a packet is scheduled and leaves the packet buffer/traffic manager, the packet may be parsed again to generate an egress PHV. The egress PHV may be passed through a match-action pipeline after which a final deparser operation may be executed (e.g., at deparser 208) before the demux/queue 209 sends the packet to the TX MAC 210 or recirculates it back to the arbiter 205 for additional processing.

A network appliance 201 can have a peripheral component interconnect extended (PCIe) interface such as PCIe media access control (MAC) 214. A PCIe MAC can have a base address register (BAR) at a base address in a host system's memory space. Processes, typically device drivers within the host system's operating system, can communicate with a NIC via a set of registers beginning with the BAR. Some PCIe devices are single root input output virtualization (SR-MY) capable. Such PCIe devices can have a physical function (PF) and a virtual function (VF). A PCIe SR-IOV capable device may have multiple VFs. A PF BAR map 215 can be used by the host machine to communicate with the PCIe card. A VF BAR map 216 can be used by a virtual machine (VM) running on the host to communicate with the PCIe card. Typically, the VM can access the NIC using a device driver within the VM and at a memory address within the VMs memory space. Many SR-IOV capable PCIe cards can map that location in the VM's memory space to a VF BAR. As such a VM may be configured as if it has its own NIC while in reality it is associated with a VF provided by a SR-IOV capable NIC. As discussed below, some PCIe devices can have multiple PFs. For example, a NIC can provide network connectivity via one PF and can provide an InfiniBand channel adapter via another PF. As such, the NIC can provide "NIC' VFs and "InfiniBand" VFs to VMs running on the host. The Infini-Band PF and VFs can be used for data transfers, such as remote direct memory access (RDMA) transfers to other VMs running on the same or other host computers. Similarly, a NIC can provide non-volatile memory express (NVMe) and small computer system interface (SCSI) PFs and VFs to VMs running on the host.

Figure 3:
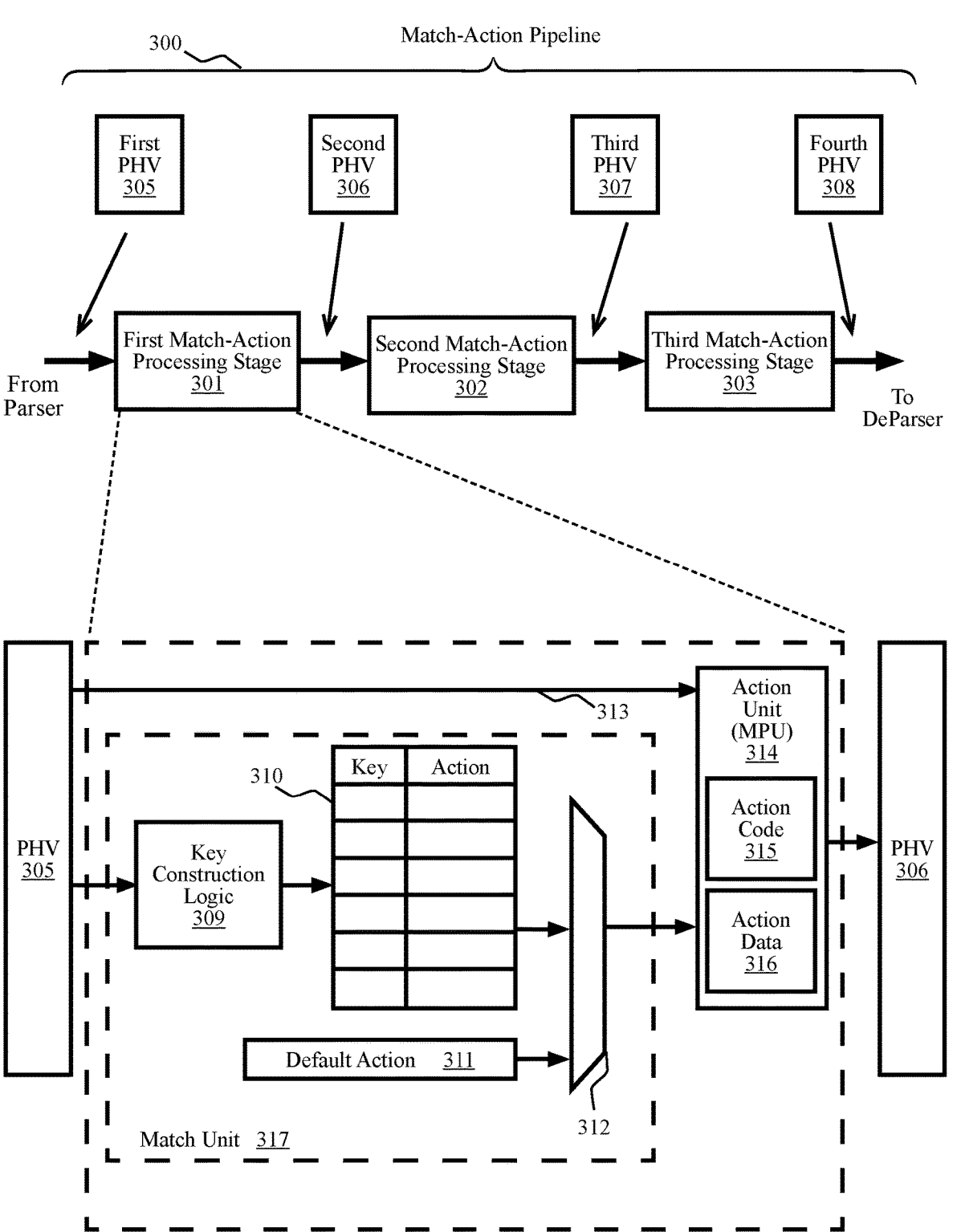
FIG. 3 is a functional block diagram illustrating an example of a match-action processing stage in a match-action pipeline according to some aspects.

FIG. 3 is a functional block diagram illustrating an example of a match-action unit 301 in a match-action pipeline 300 according to some aspects. FIG. 3 introduces certain concepts related to match-action units and match-action pipelines and is not intended to be limiting. The match-action units are processing stages, often called stages or match-action processing stages, of the packet processing pipeline. The match-action processing stages 301, 302, 303 of the match-action pipeline 300 are programmed to perform "match-action" operations in which a match unit performs a lookup using at least a portion of the PHV and an action unit performs an action based on an output from the match unit. A PHV generated at the parser may be passed through each of the match-action processing stages in the match-action pipeline in series and each match-action processing stages can implement a match-action operation or policy. The PHV and/or table entries may be updated in each stage of match-action processing according to the actions specified by the P4 programming. In some instances, a packet may be recirculated through the match-action pipeline, or a portion thereof, for additional processing. The first match-action processing stage 301 receives the first PHV 305 as an input and outputs the second PHV 306. The second match-action processing stage 302 receives the second PHV 306 as an input and outputs the third PHV 307. The third match-action processing stage 303 receives the third PHV 307 as an input and outputs the fourth PHV 308.

An expanded view of elements of a match-action processing stage 301 of match-action pipeline 300 is shown. The match-action processing stage includes a match unit 317 (also referred to as a "table engine") that operates on an input PHV 305 and an action unit 314 that produces an output PHV 306, which may be a modified version of the input PHV 305. The match unit 317 can include key construction logic 309, a lookup table 310, and selector logic 312. The key construction logic 309 is configured to generate a key from at least one field in the PHV (e.g., 5-tuple, InfiniBand queue pair identifiers, etc.). The lookup table 310 is populated with key-action pairs, where a key-action pair can include a key (e.g., a lookup key) and corresponding action code 315 and/or action data 316. A P4 lookup table may be viewed as a generalization of traditional switch tables, and can be programmed to implement, for example, routing tables, flow lookup tables, access control lists (ACLs), and other user-defined table types, including complex multi-variable tables. The key generation and lookup functions constitute the "match" portion of the operation and produce an action that is provided to the action unit via the selector logic. The action unit executes an action over the input data (which may include data 313 from the PHV) and provides an output that forms at least a portion of the output PHV. For example, the action unit executes action code 315 on action data 316 and data 313 to produce an output that is included in the output PHV 306. If no match is found in the lookup table, then a default action 311 may be implemented. A flow miss is an example of a default action that may be executed when no match is found. The operations of the match-action processing stages can be programmable by the control plane via P4 and the contents of the lookup table can be managed by the control plane.

Figure 4:
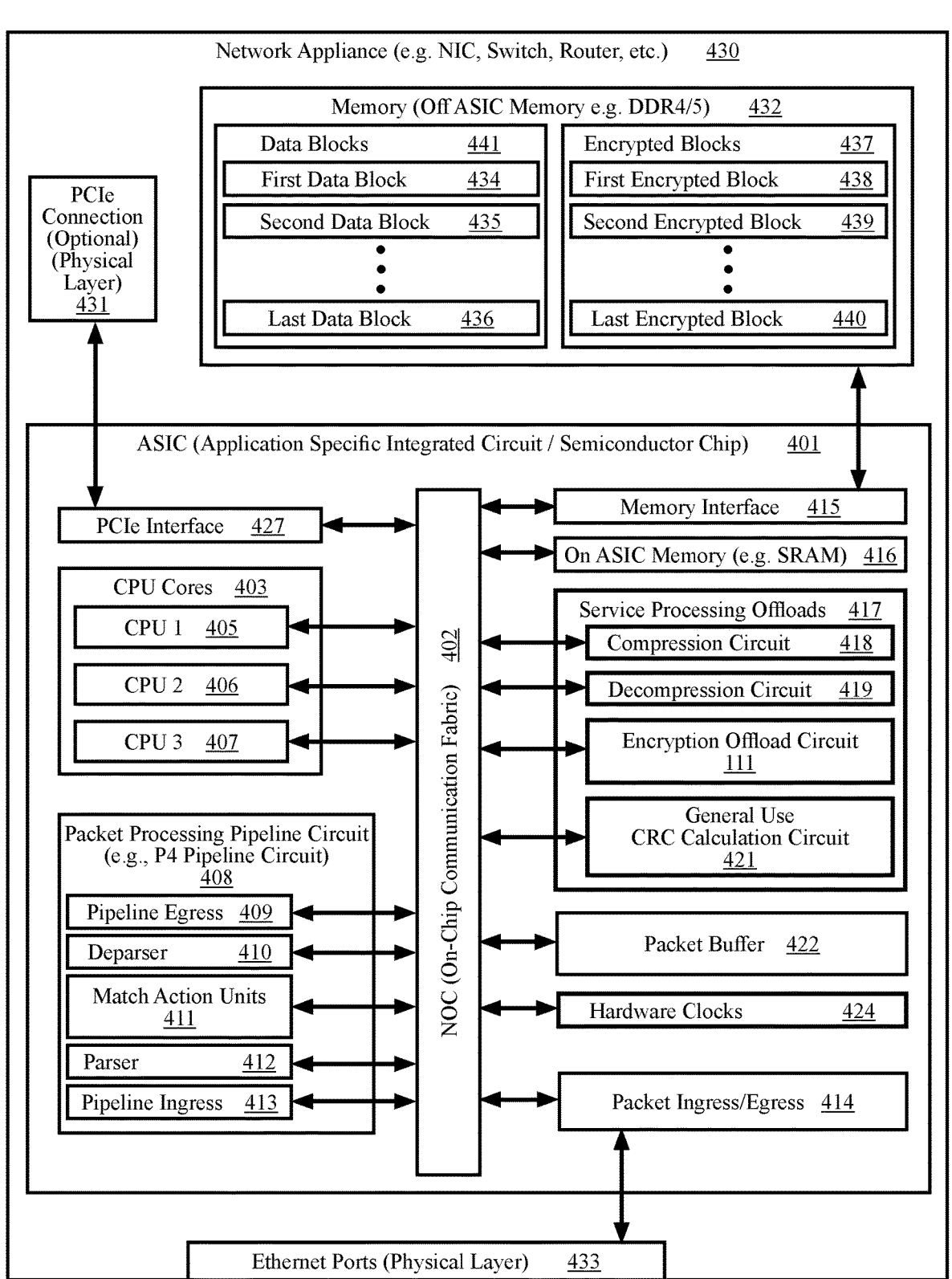
FIG. 4 is a functional block diagram of a network appliance having an application specific integrated circuit (ASIC), according to some aspects.

FIG. 4 is a functional block diagram of a network appliance 430 having an application specific integrated circuit (ASIC) 401, according to some aspects. The ASIC 401 show a single semiconductor chip implementing a large number of hardware functions. A different and substantially equivalent implementation may employ a chiplet architecture. If the network appliance is a network interface card (NIC) then the NIC can be installed in a host computer 450 and can act as a network appliance for the host computer and for virtual machines running on the host computer. Such a NIC can have a PCIe connection 431 for communicating with the host computer 450 via a host PCIe connection 451. The network appliance 430 can have an ASIC 401, off ASIC memory 432, and ethernet ports 433. The off ASIC memory 432 can be one of the widely available memory modules or chips such as double data rate 4 (DDR4) synchronous dynamic random-access memory (SDRAM) such that the ASIC has access to many gigabytes of memory on the network appliance 430. The ethernet ports 433 provide physical connectivity to a computer network such as the internet. The NIC can include a printed circuit board to which the ASIC 401 and the memory 432 are attached.

The ASIC 401 is a semiconductor chip having many core circuits interconnected by an on-chip communications fabric, sometimes called a network on a chip (NOC) 402. NOCs are often implementations of standardized communications fabrics such as the widely used advanced extensible interface (AXI) bus. The ASIC's core circuits can include a PCIe interface 427, CPU cores 403, P4 packet processing pipeline 408 elements, memory interface circuit 415, on ASIC memory such as static random access memory (SRAM) 416, service processing offloads 417, a packet buffer 422, extended packet processing pipeline 423, and packet ingress/egress circuits 414. The PCIe interface 427 can be used to communicate with a host computer via the PCIe connection 431. The CPU cores 403 can include numerous CPU cores such as CPU 1 405, CPU 2 406, and CPU 3 407. The P4 packet processing pipeline circuit 408 can include a pipeline ingress circuit 413, a parser circuit 412, match-action processing stages 411, a deparser circuit 410, and a pipeline egress circuit 409. The service processing offloads 417 are circuits implementing functions that the ASIC uses so often that the designer has chosen to provide hardware for offloading those functions from the CPUs. The service processing offloads can include a compression circuit 418, decompression circuit 419, an encryption offload circuit 111, and a general use CRC calculation circuit 421. The encryption offload circuit 111 can encrypt a data block and produce a digest value for that encrypted block using a single read of the data block from the memory 432. The general use CRC calculation circuit 421 can calculate digest values for data blocks. For example, the general use CRC calculation circuit 421 can calculate Ethernet FCS values. The specific core circuits implemented within the non-limiting example of ASIC 401 can be selected such that the ASIC implements many, perhaps all, of the functionality of an InfiniBand channel adapter, of an NVMe card, and of a network appliance that processes network traffic flows carried by internet protocol (IP) packets.

A network device can include precision clocks that output a precise time, clocks that are synchronized to remote authoritative clocks via precision time protocol (PTP), and hardware clocks 424. A hardware clock may provide a time value (e.g., year/day/hour/minute/second/ . . . ) or may simply be a counter that is incremented by one at regular intervals (e.g., once per clock cycle for a device having a 10 nsec. clock period). Time values obtained from the clocks can be used as timestamps for events such as enqueuing/dequeuing a packet.

The packet processing pipeline circuit 408 is a specialized set of elements for processing network packets such as internet protocol (IP) packets and InfiniBand protocol data units (PDUs). The packet processing pipeline circuit 408 can be a P4 packet processing pipeline circuit that implements a P4 pipeline that can be configured using a domain-specific language such as the P4 domain specific language. As described in the P4 specification, the primary abstractions provided by the P4 language relate to header types, parsers, tables, actions, match-action units, control flow, extern objects, user-defined metadata, and intrinsic metadata.

The network appliance 430 can include a memory 432 for running Linux or some other operating system and for storing data used by the processes implementing network services, upgrading the control plane, and upgrading the data plane. The network appliance can use the memory 432 to store data blocks 441 and encrypted blocks 437. The data blocks 441 can include a first data block 434, a second data block 435, and a last data block 436. The encrypted blocks 437 can include a first encrypted block 438, a second encrypted block 439, and a last encrypted block 440. The encryption offload circuit 111 can produce the first encrypted block 438 and a first digest value from a single read of only the first data block 434 from the memory 432. The encryption offload circuit 111 can produce the first digest value without reading the first encrypted block 438 from the memory 432. The encryption offload circuit 111 can produce the first encrypted block 438 by encrypting the first data block 434. The first digest value may be the CRC-32 value for the first encrypted block 438.

The CPU cores 403 can be general purpose processor cores, such as ARM processor cores, microprocessor without interlocked pipelined stages (MIPS) processor cores, and/or x86 processor cores, as is known in the field. Each CPU core can include an arithmetic logic unit (ALU), a register bank, an instruction fetch unit, and an instruction decoder, which are configured to execute instructions independently of the other CPU cores. The CPU cores may be Reduced Instruction Set Computers (RISC) CPU cores that are programmable using a general-purpose programming language such as C.

The CPU cores 403 can also include a bus interface, internal memory, and a memory management unit (MMU) and/or memory protection unit. For example, the CPU cores may include internal cache, e.g., L1 cache and/or L2 cache, and/or may have access to nearby L2 and/or L3 cache. Each CPU core may include core-specific L1 cache, including instruction-cache and data-cache and L2 cache that is specific to each CPU core or shared amongst a small number of CPU cores. L3 cache may also be available to the CPU cores.

There may be multiple CPU cores 403 available for control plane functions and for implementing aspects of a slow data path that includes software implemented packet processing functions. The CPU cores may be used to implement discrete packet processing operations such as L7 applications (e.g., HTTP load balancing, L7 firewalling, and/or L7 telemetry), certain InfiniBand channel adapter functions, flow table insertion or table management events, connection setup/management, multicast group join, deep packet inspection (DPI) (e.g., URL inspection), storage volume management (e.g., NVMe volume setup and/or management), encryption, decryption, compression, and decompression, which may not be readily implementable through a domain-specific language such as P4, in a manner that provides fast path performance as is expected of data plane processing.

The packet buffer 422 can act as a central on-chip packet switch that delivers packets from the network interfaces 433 to packet processing elements of the data plane and vice-versa. The packet processing elements can include a slow data path implemented in software and a fast data path implemented by a packet processing circuit 408.

The packet processing pipeline circuit 408 can be a specialized circuit or part of a specialized circuit using one or more ASICs or FPGAs to implement programmable packet processing pipelines such as the programmable packet processing pipeline 204 of FIG. 2. Some embodiments include ASICs or FPGAs implementing a P4 pipeline as a fast data path within the network appliance. The fast data path is called the fast data path because it processes packets faster than a slow data path that can also be implemented within the network appliance. An example of a slow data path is a software implemented data path wherein the CPU cores 403 and memory 432 are configured via software to implement a slow data path. A network appliance having two data paths has a fast data path and a slow data path when one of the data paths processes packets faster than the other data path.

All memory transactions in the network appliance 430, including host memory transactions, on board memory transactions, and register reads/writes may be performed via a coherent interconnect 402. In one non-limiting example, the coherent interconnect can be provided by a network on a chip (NOC) "IP core". Semiconductor chip designers may license and use prequalified IP cores within their designs. Prequalified IP cores may be available from third parties for inclusion in chips produced using certain semiconductor fabrication processes. A number of vendors provide NOC IP cores. The NOC may provide cache coherent interconnect between the NOC masters, including the packet processing pipeline circuit 408, CPU cores 403, memory interface circuit 415, and PCIe interface 427. The interconnect may distribute memory transactions across a plurality of memory interfaces using a programmable hash algorithm. All traffic targeting the memory may be stored in a NOC cache (e.g., 1 MB cache). The NOC cache may be kept coherent with the CPU core caches.

Figure 5:
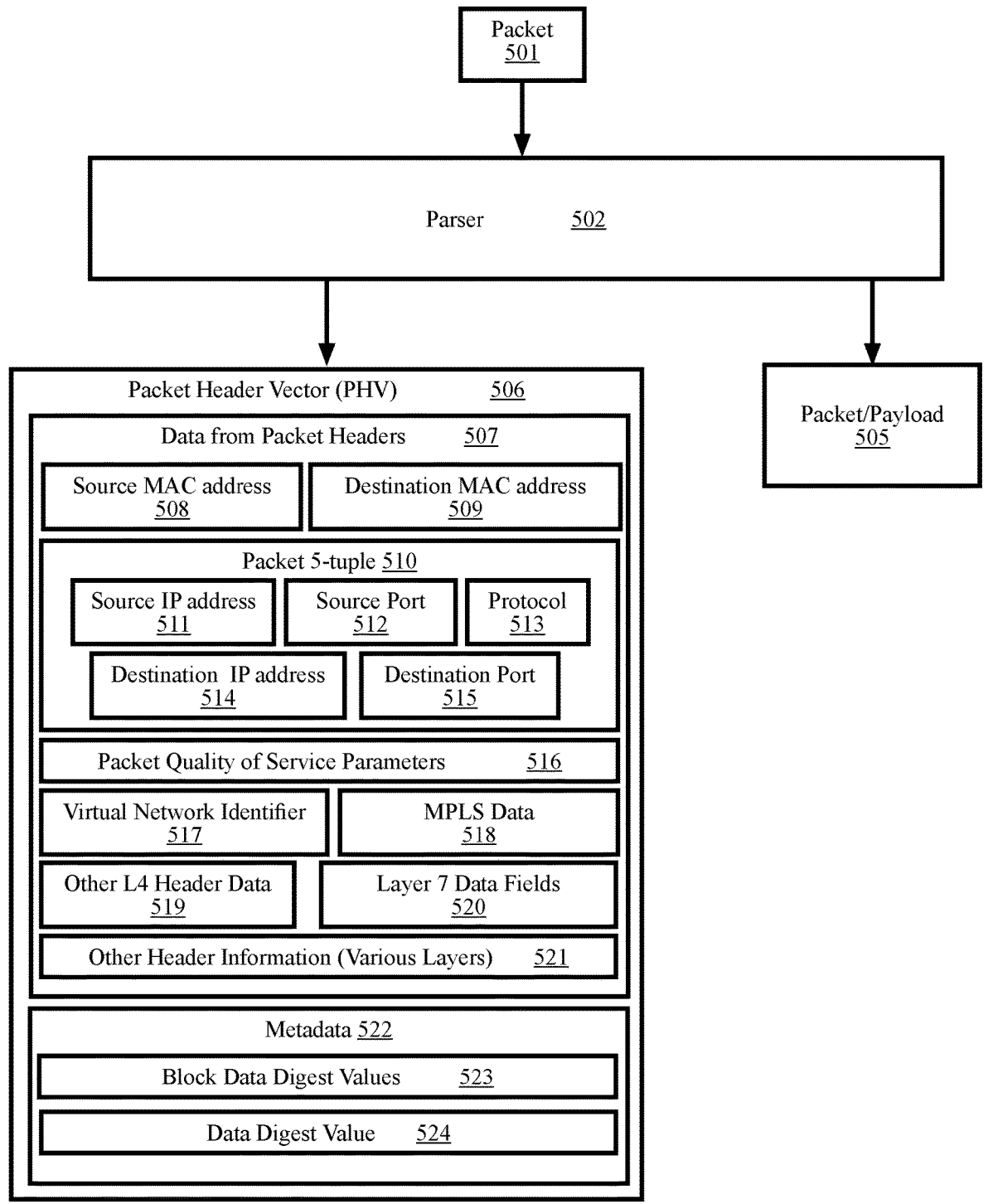
FIG. 5 is a high-level diagram illustrating an example of generating a packet header vector from a packet according to some aspects.

FIG. 5 is a high-level diagram illustrating an example of generating a packet header vector 506 from a packet 501 according to some aspects. The parser 502 can receive a packet 501 that has layer 2, layer 3, layer 4, and layer 7 headers and payloads. The parser can generate a packet header vector (PHV) from packet 501. The packet header vector 506 can include many data fields including data from packet headers 507 and metadata 522. The metadata 522 can include data generated by the network appliance such as the hardware port on which the packet 501 was received and the packet timestamps indicating when the packet 501 was received by the network appliance, enqueued, dequeued, etc. The metadata 522 can also include data produced by the network appliance while processing a packet or assembling a packet. Such metadata 522 can include block data digest values 523 and a data digest value. A block data digest value is the digest value calculated for a single block of data. For example, the block data digest values 523 can include a first digest value, a second digest value, and a third digest value. The first digest value can be the digest value for the first encrypted block 438. The second digest value can be the digest value for a second encrypted block 439. The third digest value can be the digest value for a third encrypted block. The block data digest values 523 may be produced by the encryption offload circuit 111 and stored in the PHV by the encryption offload circuit 111. The data digest value can be a digest value for all of the data blocks in a packet payload. For example, the packet can be an NVMe PDU that includes the first encrypted block 438 and the second encrypted block 439. The digest value for the NVMe PDU may be the data digest value 524 and the data digest value 524 may be calculated from the first digest value and the second digest value that are stored as block data digest values 523. The data digest value 524 may be calculated as the exclusive OR (XOR) of the block data digest values 523. A XOR circuit may produce the checksum of the block data digest values 523. The data digest value 524 may be a checksum of the block data digest values 523. A checksum circuit may produce the checksum of the block data digest values 523. The checksum may be an Adler-32 checksum. The Adler-32 checksum is a notoriously well-known checksum that has been used for data digest values since 1995. The data digest value 524 may be the sum of the block data digest values 523. A summation circuit may produce the sum of the block data digest values 523. The data digest value 524 may be a CRC value for the block data digest values 523. The general use CRC calculation circuit 421 may produce the CRC value from the block data digest values 523 (e.g., the CRC of a concatenation of the block data digest values 523).

The source MAC address 508 and the destination MAC address 509 can be obtained from the packet's layer 2 header. The source IP address 511 can be obtained from the packet's layer 3 header. The source port 512 can be obtained from the packet's layer 4 header. The protocol 513 can be obtained from the packet's layer 3 header. The destination IP address 514 can be obtained from the packet's layer 3 header. The destination port 515 can be obtained from the packet's layer 4 header. The packet quality of service parameters 516 can be obtained from the packet's layer 3 header or another header based on implementation specific details. The layer 4 header data 517 may be obtained from the packet's layer 4 header. The multi-protocol label switching (MPLS) data 518, such as an MPLS label, may be obtained from the packet's layer 2 header. The layer 7 header data 519 can be obtained from the packet's layer 7 header. The other layer 7 data fields 520 can be obtained from the packet's layer 7 payload. The other header information 521 is the other information contained in the packet's layer 2, layer 3, layer 4, and layer 7 headers.

The packet 5-tuple 510 is often used for generating keys for match tables. The packet 5-tuple 510 can include the source IP address 511, the source port 512, the protocol 513, the destination IP address 514, and the destination port 515.

Those practiced in computer networking protocols realize that the headers carry much more information than that described here, realize that substantially all of the headers are standardized by documents detailing header contents and fields, and know how to obtain those documents. The parser can also be configured to output a packet or payload 505. Recalling that the parser 502 is a programmable element that is configured through the domain-specific language (e.g., P4) to extract information from a packet, the specific contents of the packet or payload 505 are those contents specified via the domain specific language. For example, the contents of the packet or payload 505 can be the layer 3 payload.

Figure 6:
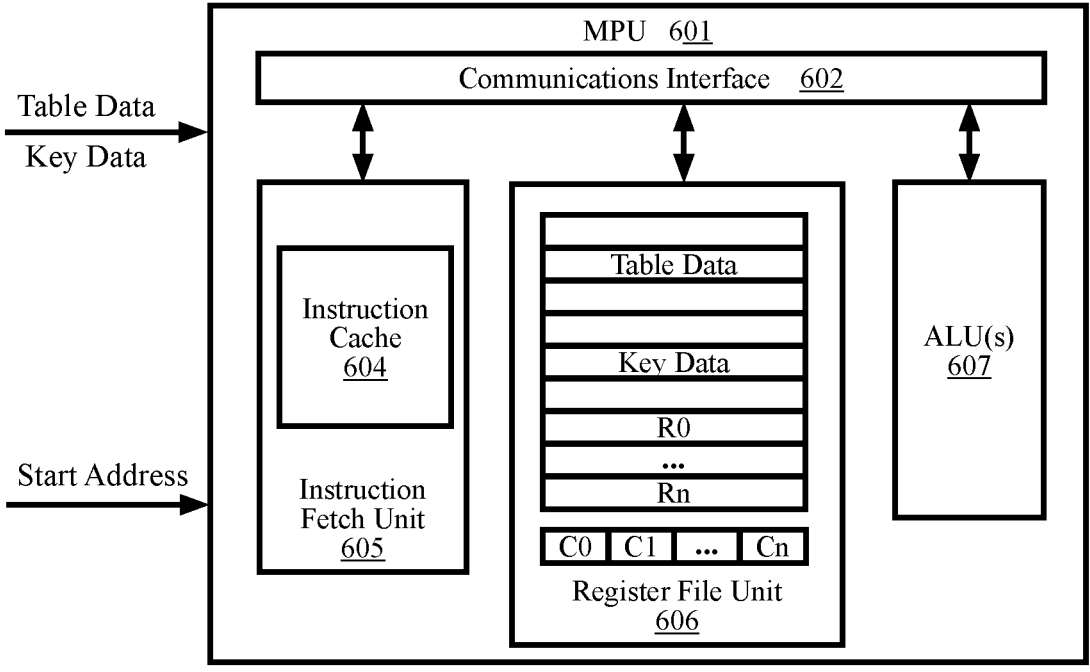
FIG. 6 illustrates a block diagram of a match processing unit (MPU) that may be used within the exemplary system of FIG. 4 to implement some aspects.

FIG. 6 illustrates a block diagram of a match processing unit (MPU) 601, also referred to as an action unit, that may be used within the exemplary system of FIG. 4 to implement some aspects. The MPU 601 can have multiple functional units, memories, and a register file. For example, the MPU 601 may have an instruction fetch unit 605, a register file unit 606, a communication interface 602, arithmetic logic units (ALUs) 607 and various other functional units.

In the illustrated example, the MPU 601 can have a write port or communication interface 602 allowing for memory read/write operations. For instance, the communication interface 602 may support packets written to or read from an external memory or an internal static random-access memory (SRAM). The communication interface 602 may employ any suitable protocol such as advanced extensible interface (AXI) protocol. AXI is a high-speed/high-end on-chip bus protocol and has channels associated with read, write, address, and write response, which are respectively separated, individually operated, and have transaction properties such as multiple-outstanding address or write data interleaving. The AXI interface 602 may include features that support unaligned data transfers using byte strobes, burst based transactions with only start address issued, separate address/control and data phases, issuing of multiple outstanding addresses with out of order responses, and easy addition of register stages to provide timing closure. For example, when the MPU executes a table write instruction, the MPU may track which bytes have been written to (a.k.a. dirty bytes) and which remain unchanged. When the table entry is flushed back to the memory, the dirty byte vector may be provided to AXI as a write strobe, allowing multiple writes to safely update a single table data structure as long as they do not write to the same byte. In some cases, dirty bytes in the table need not be contiguous and the MPU may only write back a table if at least one bit in the dirty vector is set. Though packet data is transferred according the AXI protocol in the on-chip communications fabric system according to the present exemplary embodiment in the present specification, it can also be applied to a packet data communication on-chip interconnect system operating by other protocols supporting a lock operation, such as advanced high-performance bus (AHB) protocol or advanced peripheral bus (APB) protocol in addition to the AXI protocol.

The MPU 601 can have an instruction fetch unit 605 configured to fetch instructions from a memory external to the MPU based on the input table result or at least a portion of the table result. The instruction fetch unit may support branches and/or linear code paths based on table results or a portion of a table result provided by a table engine. In some cases, the table result may comprise table data, key data and/or a start address of a set of instructions/program. The instruction fetch unit 605 can have an instruction cache 604 for storing one or more programs. In some cases, the one or more programs may be loaded into the instruction cache 604 upon receiving the start address of the program provided by the table engine. In some cases, a set of instructions or a program may be stored in a contiguous region of a memory unit, and the contiguous region can be identified by the address. In some cases, the one or more programs may be fetched and loaded from an external memory via the communication interface 602. This provides flexibility to allow for executing different programs associated with different types of data using the same processing unit. In an example, a management PHV can be injected into the pipeline, for example to perform administrative table direct memory access (DMA) operations or entry aging functions (i.e., adding timestamps), one of the management MPU programs may be loaded to the instruction cache to execute the management function. The instruction cache 604 can be implemented using various types of memories such as one or more SRAMs.

The one or more programs can be any programs such as P4 programs related to reading table data, building headers, DMA to/from memory, writing to/from memory, and various other actions. The one or more programs can be executed in any match-action processing stage.

The MPU 601 can have a register file unit 606 to stage data between the memory and the functional units of the MPU, or between the memory external to the MPU and the functional units of the MPU. The functional units may include, for example, ALUs, meters, counters, adders, shifters, edge detectors, zero detectors, condition code registers, status registers, and the like. In some cases, the register file unit 606 may comprise a plurality of general-purpose registers (e.g., R0, R1, . . . Rn) which may be initially loaded with metadata values then later used to store temporary variables within execution of a program until completion of the program. For example, the register file unit 606 may be used to store SRAM addresses, ternary content addressable memory (TCAM) search values, ALU operands, comparison sources, or action results. The register file unit of a stage may also provide data/program context to the register file of the subsequent stage, as well as making data/program context available to the next stage's execution data path (i.e., the source registers of the next stage's adder, shifter, and the like). In some embodiments, each register of the register file is 64 bits and may be initially loaded with special metadata values such as hash value from table lookup, packet size, PHV timestamp, programmable table constant and the like.

In some embodiments, the register file unit 606 can have a comparator flags unit (e.g., C0, C1, . . . Cn) configured to store comparator flags. The comparator flags can be set by calculation results generated by the ALU which in return can be compared with constant values in an encoded instruction to determine a conditional branch instruction. In some embodiments, the MPU can have one-bit comparator flags (e.g., 8 one-bit comparator flags). In practice, an MPU can have any number of comparator flag units each of which may have any suitable length.

The MPU 601 can have one or more functional units such as the ALU(s) 607. An ALU may support arithmetic and logical operations on the values stored in the register file unit 606. The results of the ALU operations (e.g., add, subtract, AND, OR, XOR, NOT, AND NOT, shift, and compare) may then be written back to the register file. The functional units of the MPU may, for example, update or modify fields anywhere in a PHV, write to memory (e.g., table flush), or perform operations that are not related to PHV update. For example, an ALU may be configured to perform calculations on descriptor rings, scatter gather lists (SGLs), and control data structures loaded into the general purpose registers from the host memory.

The MPU 601 can have other functional units such as meters, counters, action insert units, and the like. For example, an ALU may be configured to support P4 compliant meters. A meter is a type of action executable on a table match used to measure data flow rates. A meter may include a number of bands, typically two or three, each of which has a defined maximum data rate and optional burst size. Using a leaky bucket analogy, a meter band is a bucket filled by the packet data rate and drained at a constant allowed data rate. Overflow occurs if the integration of data rate exceeding quota is larger than the burst size. Overflowing one band triggers activity into the next band, which presumably allows a higher data rate. In some cases, a field of the packet may be marked as a result of overflowing the base band. This information might be used later to direct the packet to a different queue, where it may be more subject to delay or dropping in case of congestion. The counter may be implemented by the MPU instructions. The MPU can have one or more types of counters for different purposes. For example, the MPU can have performance counters to count MPU stalls. An action insert unit or set of instructions may be configured to push the register file result back to the PHV for header field modifications.

The MPU may be capable of locking a table. In some cases, a table being processed by an MPU may be locked or marked as "locked" in the table engine. For example, while an MPU has a table loaded into its register file, the table address may be reported back to the table engine, causing future reads to the same table address to stall until the MPU has released the table lock. For instance, the MPU may release the lock when an explicit table flush instruction is executed, the MPU program ends, or the MPU address is changed. In some cases, an MPU may lock more than one table address, for example, one for the previous table write-back and another address lock for the current MPU program.

In some embodiments, a single MPU may be configured to execute instructions of a program until completion of the program. In other embodiments, multiple MPUs may be configured to execute a program. A table result can be distributed to multiple MPUs. The table result may be distributed to multiple MPUs according to an MPU distribution mask configured for the tables. This provides advantages to prevent data stalls or mega packets per second (MPPS) decrease when a program is too long. For example, if a PHV requires four table reads in one stage, then each MPU program may be limited to only eight instructions in order to maintain a 100 MPPS if operating at a frequency of 800 MHz in which scenario multiple MPUs may be desirable.

Figure 7:
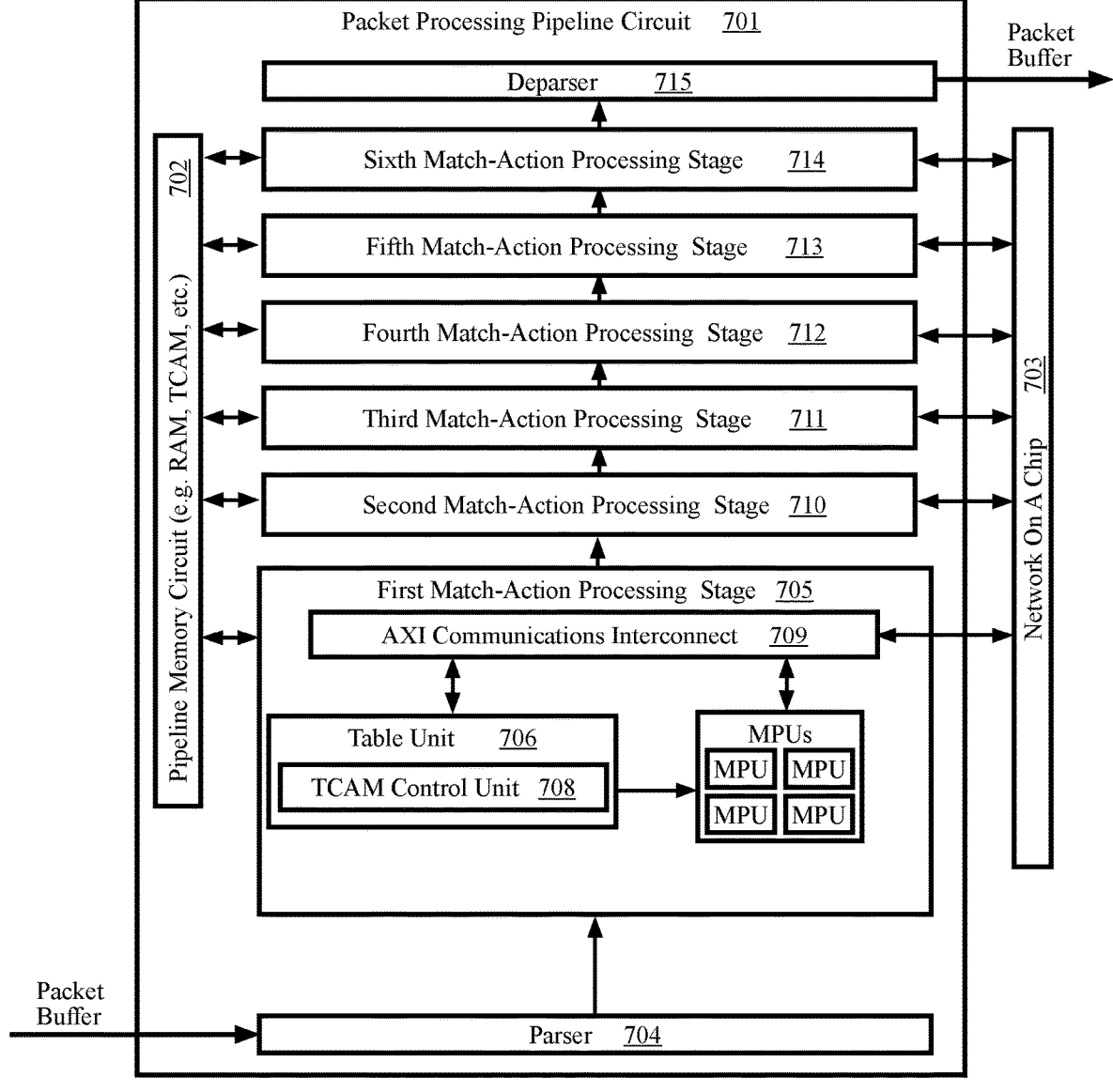
FIG. 7 illustrates a block diagram of a packet processing pipeline circuit that may be included in the exemplary system of FIG. 4.

FIG. 7 illustrates a block diagram of a packet processing pipeline circuit 701 that may be included in the exemplary system of FIG. 4. The packet processing pipeline circuit 701 can be a P4 pipeline implemented by an ASIC. The packet processing pipeline circuit 701 can be programmed to provide various features, including, but not limited to, routing, bridging, tunneling, forwarding, network ACLs, layer 4 firewalls, flow based rate limiting, VLAN tag policies, membership, isolation, multicast and group control, label push/pop operations, layer 4 load balancing, layer 4 flow tables for analytics and flow specific processing, DDOS attack detection, mitigation, telemetry data gathering on any packet field or flow state and various others.

A programmer or compiler may decompose a packet processing program or flow processing data into a set of dependent or independent table lookup and action processing stages (i.e., match-action) that can be mapped onto the table engine and MPU stages. The match-action pipeline can have a plurality of stages. For example, a packet entering the pipeline may be first parsed by a parser (e.g., parser 704) according to the packet header stack specified by a P4 program. This parsed representation of the packet may be referred to as a packet header vector (PHV). The PHV may then be passed through match-action processing stages (e.g., match-action processing stages 705, 710, 711, 712, 713, 714) of the match-action pipeline. Each match-action processing stage can be configured to match one or more PHV fields to tables and to update the PHV, table entries, or other data according to the actions specified by the P4 program. If the required number of stages exceeds the implemented number of stages, a packet can be recirculated for additional processing. The packet payload may travel in a separate queue or buffer until it is reassembled with its PHV in a deparser 715. The deparser 715 can rewrite the original packet according to the PHV fields which may have been modified in the pipeline. A packet processed by an ingress pipeline may be placed in a packet buffer for scheduling and possible replication. In some cases, once the packet is scheduled and leaves the packet buffer, it may be parsed again to create an egress PHV. The egress PHV may be passed through a P4 egress pipeline in a similar fashion as a packet passing through a P4 ingress pipeline, after which a final deparser operation may be executed before the packet is sent to its destination interface or recirculated for additional processing. The network appliance 430 of FIG. 4 can have a P4 pipeline that is implemented via a packet processing pipeline circuit 701.

A pipeline can have multiple parsers and can have multiple deparsers. The parser can be a P4 compliant programmable parser and the deparser can be a P4 compliant programmable deparser. The parser may be configured to extract packet header fields according to P4 header definitions and place them in a PHV. The parser may select from any fields within the packet and align the information from the selected fields to create the PHV. The deparser can be configured to rewrite the original packet according to an updated PHV. The pipeline MPUs of the match-processing stages 705, 710, 711, 712, 713, 714 can be the same as the MPU 601 of FIG. 6. Match-action processing stages can have any number of MPUs. The match-action processing stage of a match-action pipeline can all be identical.

A table engine 706 may be configured to support per-stage table match. For example, the table engine 706 may be configured to hash, lookup, and/or compare keys to table entries. The table engine 706 may be configured to control the address and size of the table, use PHV fields to generate a lookup key, and find Session Ids or MPU instruction pointers that define the P4 program associated with a table entry. A table result produced by the table engine can be distributed to the multiple MPUs.

The table engine 706 can be configured to control a table selection. In some cases, upon entering a stage, a PHV is examined to select which table(s) to enable for the arriving PHV. Table selection criteria may be determined based on the information contained in the PHV. In some cases, a match table may be selected based on packet type information related to a packet type associated with the PHV. For instance, the table selection criteria may be based on a debug flag, packet type or protocols (e.g., Internet Protocol version 4 (IPv4), Internet Protocol version 6 (IPv6), MPLSA, or the next table ID as determined by the preceding stage. In some cases, the incoming PHV may be analyzed by the table selection logic, which then generates a table selection key and compares the result using a TCAM to select the active tables. A table selection key may be used to drive table hash generation, table data comparison, and associated data into the MPUs.

The table engine 706 can have a ternary content-addressable memory (TCAM) control unit 708. The TCAM control unit may be configured to allocate memory to store multiple TCAM search tables. In an example, a PHV table selection key may be directed to a TCAM search stage before a SRAM lookup. The TCAM control unit may be configured to allocate TCAMs to individual pipeline stages to prevent TCAM resource conflicts, or to allocate TCAM into multiple search tables within a stage. The TCAM search index results may be forwarded to the table engine for SRAM lookups.

The table engine 706 may be implemented by hardware or circuitry. The table engine may be hardware defined. In some cases, the results of table lookups or table results are provided to the MPU in its register file.

A match-action pipeline can have multiple match-action processing stages such as the six units illustrated in the example of FIG. 7. In practice, a match-action pipeline can have any number of match-action processing stages. The match-action processing stages can share a pipeline memory circuit 702 that can be static random-access memory (SRAM), TCAM, some other type of memory, or a combination of different types of memory. The packet processing pipeline circuit stores data in the pipeline memory circuit. For example, the packet processing pipeline circuit can store a table in the pipeline memory circuit that configures the packet processing pipeline circuit to process specific network flows. For example, a flow table or multiple flow tables may be stored in the pipeline memory circuit 702 and can store instructions and data that the packet processing pipeline circuit uses to process a packet. The pipeline memory circuit is more than half full when it is storing data used by the packet processing pipeline circuit and less than half the capacity of the pipeline memory circuit is free.

Figure 8:
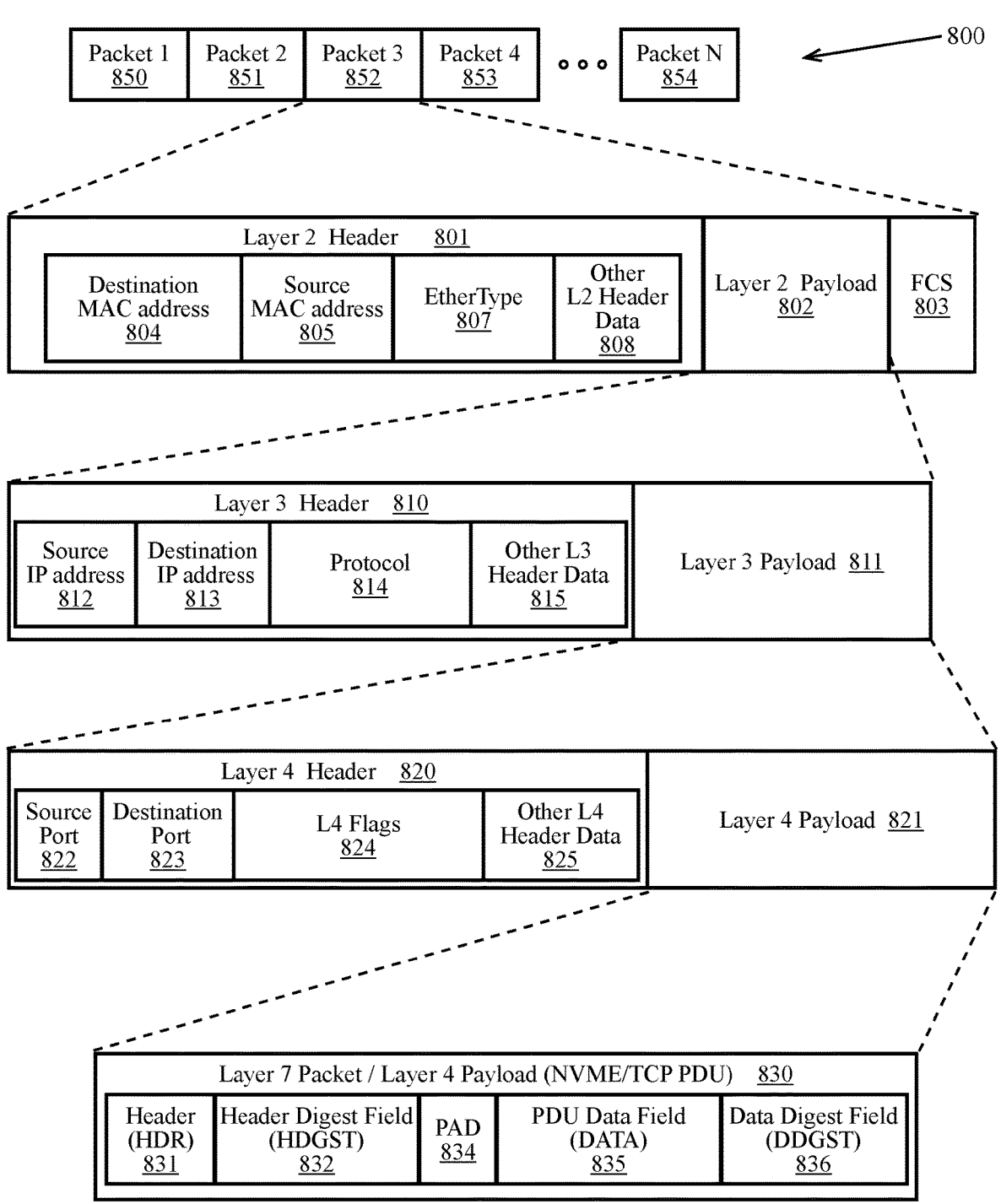
FIG. 8 illustrates packet headers and payloads of packets for network traffic flows including a NVMe/TCP PDU in a layer 4 payload according to some aspects.

FIG. 8 illustrates packet headers and payloads of packets for a network flow 800 including layer 7 fields according to some aspects. A group of network packets passing from one specific endpoint to another specific endpoint is a network flow. A network flow 800 can have numerous network packets such as a first packet 850, a second packet 851, a third packet 852, a fourth packet 853, and a final packet 854 with many more packets between the fourth packet 853 and the final packet 854. The term "the packet" or "a packet" may refer to any of the network packets in a network flow.

Packets can be constructed and interpreted in accordance with the internet protocol suite. The Internet protocol suite is the conceptual model and set of communications protocols used in the Internet and similar computer networks. A packet can be transmitted and received as a raw bit stream over a physical medium at the physical layer, sometimes called layer 1. The packets can be received by a RX MAC 211 as a raw bit stream or transmitted by TX MAC 210 as a raw bit stream.

The link layer is often called layer 2. The protocols of the link layer operate within the scope of the local network connection to which a host is attached and includes all hosts accessible without traversing a router. The link layer is used to move packets between the interfaces of two different hosts on the same link. The packet (an Ethernet packet is shown) has a layer 2 header 801, a layer 2 payload 802, and a layer 2 frame check sequence (FCS) 803. The layer 2 header can contain a source MAC address 804, a destination MAC address 805, an optional 802.1Q header 806, optional VLAN tag information 807, and other layer 2 header data 808. The input ports 211 and output ports 210 of a network appliance 201 can have MAC addresses. A network appliance 201 can have a MAC address that is applied to all or some of the ports. Alternatively, a network appliance may have one or more ports that each have their own MAC address. In general, each port can send and receive packets. As such, a port of a network appliance can be configured with a RX MAC 211 and a TX MAC 210. Ethernet, also known as Institute of Electrical and Electronics Engineers (IEEE) 802.3, is a layer 2 protocol. IEEE 802.11 (WiFi) is another widely used layer 2 protocol. The layer 2 payload 802 can include a layer 3 packet. The layer 2 FCS 803 can include a CRC (cyclic redundancy check) calculated from the layer 2 header and layer 2 payload. The layer 2 FCS can be used to verify that the packet has been received without errors.

IEEE 802.1Q is the networking standard that supports VLANs on IEEE 802.3 networks. The optional 802.1Q header 806 and VLAN tag information 807 are specified by the IEEE 802.1Q standard. The 802.1Q header is the two-octet value 0x8100 that indicates that VLAN tag information 807 is present. The VLAN tag information includes a 12-bit VLAN identifier. As such, a LAN can be configured to have 4094 VLANs (0x000 and 0xFFF are reserved values).

The internet layer, often called layer 3, is the network layer where layer 3 packets can be routed from a first node to a second node across multiple intermediate nodes. The nodes can be network appliances such as network appliance 201. Internet protocol (IP) is a commonly used layer 3 protocol that is specified in requests for comment (RFCs) published by the Internet Engineering Task Force (IETF). More specifically, the format and fields of IP packets are specified by IETF RFC 791. The layer 3 packet (an IP packet is shown) can have a layer 3 header 810 and a layer 3 payload 811. The layer 3 header of an IP packet is an IP header and the layer 3 payload of an IP packet is an IP payload. The layer 3 header 810 can have a source IP address 812, a destination IP address 813, a protocol indicator 814, and other layer 3 header data 815. As an example, a first node can send an IP packet to a second node via an intermediate node. The IP packet therefore has a source IP address indicating the first node and a destination IP address indicating the second node. The first node makes a routing decision that the IP packet should be sent to the intermediate node. The first node therefore sends the IP packet to the intermediate node in a first layer 2 packet. The first layer 2 packet has a source MAC address 804 indicating the first node, a destination MAC address 805 indicating the intermediate node, and has the IP packet as a payload. The intermediate node receives the first layer 2 packet. Based on the destination IP address, the intermediate node determines that the IP packet is to be sent to the second node. The intermediate node sends the IP packet to the second node in a second layer 2 packet having a source MAC address 804 indicating the intermediate node, a destination MAC address 805 indicating the second node, and the IP packet as a payload. The layer 3 payload 811 can include headers and payloads for higher layers in accordance with higher layer protocols such as transport layer protocols.

The transport layer, often called layer 4, can establish basic data channels that applications use for task-specific data exchange and can establish host-to-host connectivity. A layer 4 protocol can be indicated in the layer 3 header 810 using protocol indicator 814. Transmission control protocol (TCP, specified by IETF RFC 793), user datagram protocol (UDP, specified by IETF RFC 768), and internet control message protocol (ICMP, specified by IETF RFC 792) are common layer 4 protocols. TCP is often referred to as TCP/IP. TCP is connection oriented and can provide reliable, ordered, and error-checked delivery of a stream of bytes between applications running on hosts communicating via an IP network. When carrying TCP data, a layer 3 payload 811 includes a TCP header and a TCP payload. UDP can provide for computer applications to send messages, in this case referred to as datagrams, to other hosts on an IP network using a connectionless model. When carrying UDP data, a layer 3 payload 811 includes a UDP header and a UDP payload. ICMP is used by network devices, including routers, to send error messages and operational information indicating success or failure when communicating with another IP address. ICMP uses a connectionless model.

A layer 4 packet (a TCP packet is shown) can have a layer 4 header 820 (a TCP header is shown) and a layer 4 payload 821 (a TCP payload is shown). The layer 4 header 820 can include a source port 822, destination port 823, layer 4 flags 824, and other layer 4 header data 825. The source port and the destination port can be integer values used by host computers to deliver packets to application programs configured to listen to and send on those ports. The layer 4 flags 824 can indicate a status of or action for a network traffic flow. A layer 4 payload 821 can contain a layer 7 packet.

The application layer, often called layer 7, includes the protocols used by most applications for providing user services or exchanging application data over the network connections established by the lower level protocols. Examples of application layer protocols include NVMe/ TCP, RDMA over Converged Ethernet version 2, (RoCE v2), Hypertext Transfer Protocol (HTTP), File Transfer Protocol (FTP), Simple Mail Transfer Protocol (SMTP), and Dynamic Host Configuration (DHCP). Data coded according to application layer protocols can be encapsulated into transport layer protocol data units (such as TCP or UDP messages), which in turn use lower layer protocols to effect actual data transfer.

A layer 4 payload 821 may include a layer 7 packet 830. The illustrated layer 7 packet is a NVMe/TCP PDU 830. NVM Express, Inc. is a trade organization that provides standards for NVMe communications. Version 1.0 of the NVM Express TCP Transport Specification was published on May 18, 2021 and discloses the contents and structure of NVMe PDUs. An NVMe/TCP PDU can include a header 831, a header digest field 832, a pad 834, a PDU data field 835, and a data digest field 836. The PDU data field 835 can hold the first encrypted block 438. When the PDU data field 835 holds the first encrypted block 438, the data digest field 836 should hold the digest value for the first encrypted block 438. The PDU data field 835 can hold numerous encrypted blocks. When the PDU data field 835 holds numerous encrypted blocks, the data digest field 836 should hold the digest value for the entire PDU data field 835. Such a digest value may be determined from the individual digest values of the numerous encrypted blocks in the PDU data field.

Figure 9:
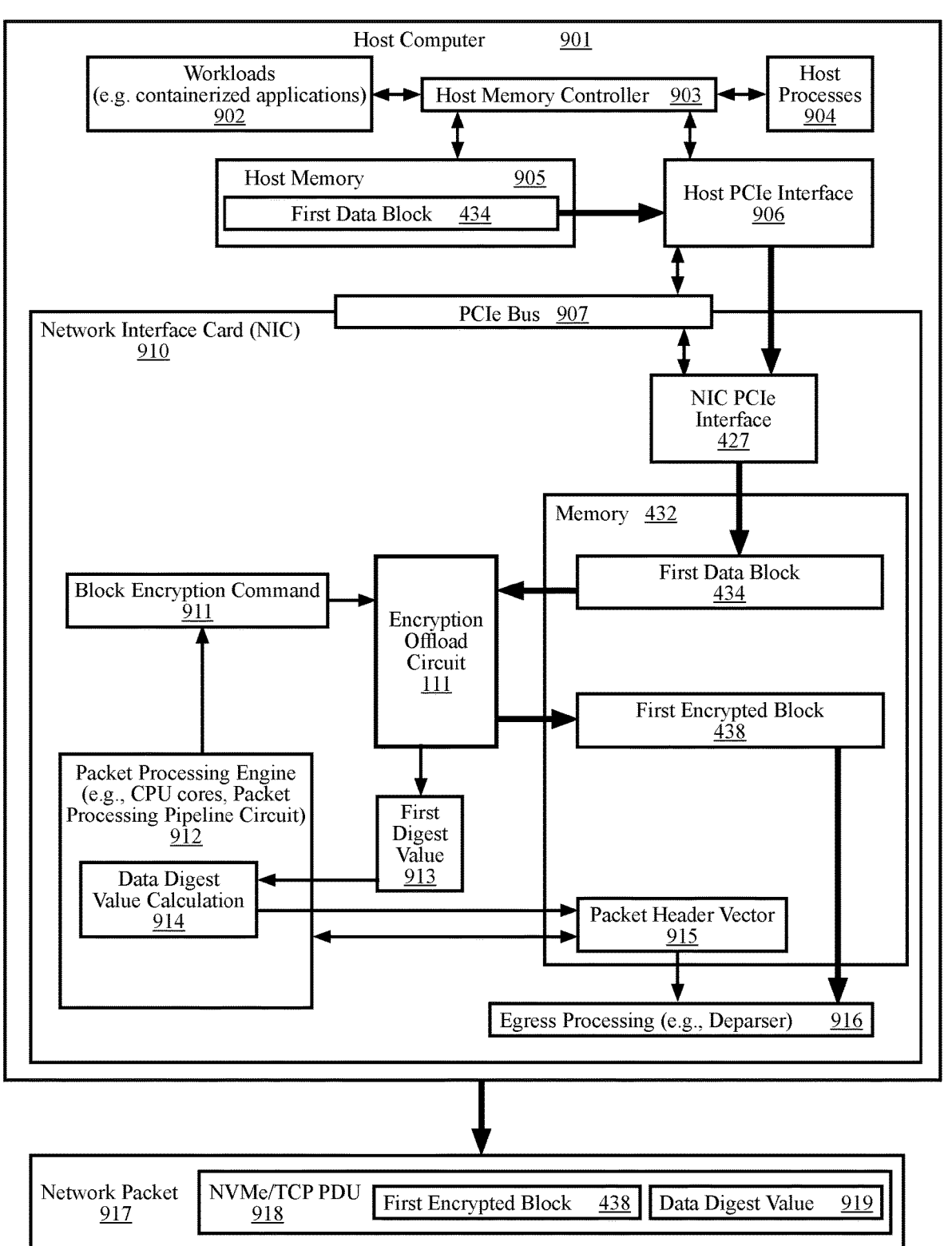
FIG. 9 is a high-level conceptual diagram illustrating production of a network packet from a data block in a host memory according to some aspects.

FIG. 9 is a high-level conceptual diagram illustrating production of a network packet 917 from a data block 434 in a host memory 905 according to some aspects. Host processes 904 and workloads 902, such as containerized applications, are running on a host computer 901. The host computer 901 has host memory 905 that the workloads 902 and host processes 904 can access via a host memory controller 903. The host computer 901 has a host PCIe interface 906 that is connected to a PCIe bus. A NIC 910 is installed in the host computer 901. The NIC 910 has a NIC PCIe interface 427 connected to the PCIe bus 907. The host computer 901 and the NIC 910 can communicate via the PCIe bus 907. The NIC can include a packet processing engine 912, an encryption offload circuit 111, and a memory 432. The packet processing engine 912 may be implemented using CPU cores, a packet processing circuit, etc.

The host processes 904 and the workloads 902 can use the NIC 910 to access a remote data store such as a storage area network (SAN), a network attached storage (NAS) device, etc. For example, a host process can use an NVMe command to write a first data block 434 to a disk. In this case, the disk is a virtual disk provided by a SAN and the first data block will actually be stored in the SAN. The first data block may be copied from the host memory 905 to the memory 432 of the NIC 910. The packet processing engine 912 can send a block encryption command 911 to the encryption offload circuit 111. In response to the block encryption command 911, the encryption offload circuit 111 can read the data block 434 from the memory 432, produce a first encrypted block 438 by encrypting the first data block 434, calculate a first digest value 913 from the first encrypted block 438, write the first encrypted block to memory 432, and send the first digest value 913 to the packet processing engine 912. The encryption offload circuit 111 may begin calculating the first digest value 913 before the first encrypted block 438 is entirely available because the encryption offload circuit 111 has access to the encrypted block 438 as it is being produced. The encryption offload circuit 111 may return the first digest value 913 to the packet processing engine in response to the block encryption command 911. The encryption offload circuit 111 may store the first digest value 913 in a PHV 915 that is stored in the memory. For example, the block encryption command 911 may include a memory address at which the first digest value 913 is to be stored. Writing a 4-byte digest value to memory consumes very little memory bandwidth in comparison to reading or writing data blocks that can easily exceed 4000 bytes (e.g., 4096 Bytes, 8192 bytes, 16384 bytes, . . . ).

In preparation for assembling the network packet 917, the packet processing engine can perform a data digest value calculation 914 to produce a digest value for the data digest field 836. If the first encrypted block is the only block that will be in the NVMe/TCP PDU 918, the first digest value can be the data digest value 524 in the data digest value field of the PHV. If the NVMe/TCP PDU is to include more than one encrypted block then a final digest value can be calculated from the digest values of those encrypted blocks and that final digest value can be the data digest value 524 in the data digest value field of the PHV. Other PHV fields may be populated by the packet processing engine such that a deparser 916 in the NIC 910 can assemble the network packet 917 from the PHV 915, the first encrypted block 438, and any other encrypted blocks that are to also be included. The network packet 917 can be a NVMe/TCP PDU 918 encapsulated in a TCP packet that is encapsulated in an IP packet, as is illustrated in FIG. 8. The PDU data field 835 of the NVMe/TCP PDU 918 can include the first encrypted block 438. The data digest field 836 of the NVMe/TCP PDU 918 can include the first digest value 913.

Figure 10:
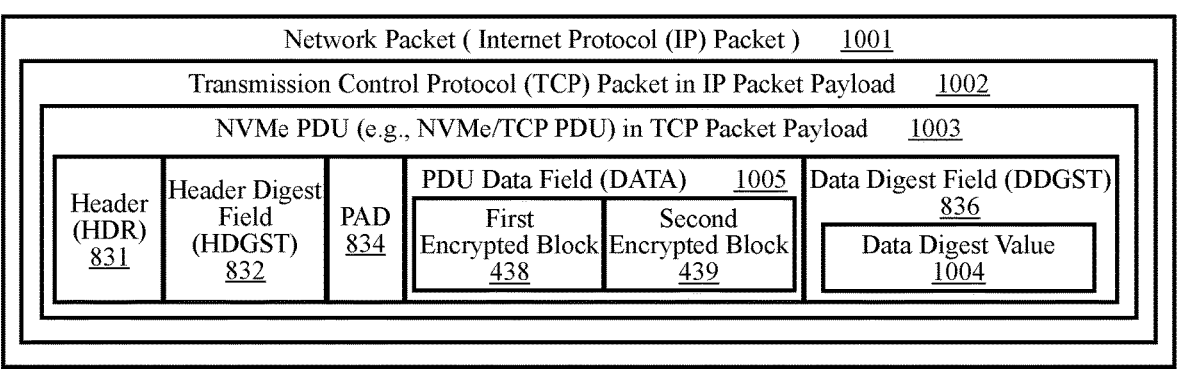
FIG. 10 is a high-level conceptual diagram illustrating a NVMe/TCP PDU in an internet protocol (IP) packet according to some aspects.

FIG. 10 is a high-level conceptual diagram illustrating a NVMe/TCP PDU 1003 in an IP packet 1001 according to some aspects. A TCP packet 1002 is the payload of the network packet 1001. The NVMe/TCP PDU 1003 is the payload of the TCP packet 1002. The NVMe/TCP PDU is a NVMe PDU that is formatted for being the payload of other packets such as a TCP packet 1002. A first encrypted block 438 and a second encrypted block 439 are in the PDU data field 1005 of the NVMe/TCP PDU 1003. The data digest value 1004 is a digest value for the entire PDU data field 1005. As discussed above, the encryption offload circuit 111 can calculate a first digest value for the first encrypted block and can calculate a second digest value for the second encrypted block. The data digest value 1004 may be calculated from the first digest value and the second digest value.

Figure 11:
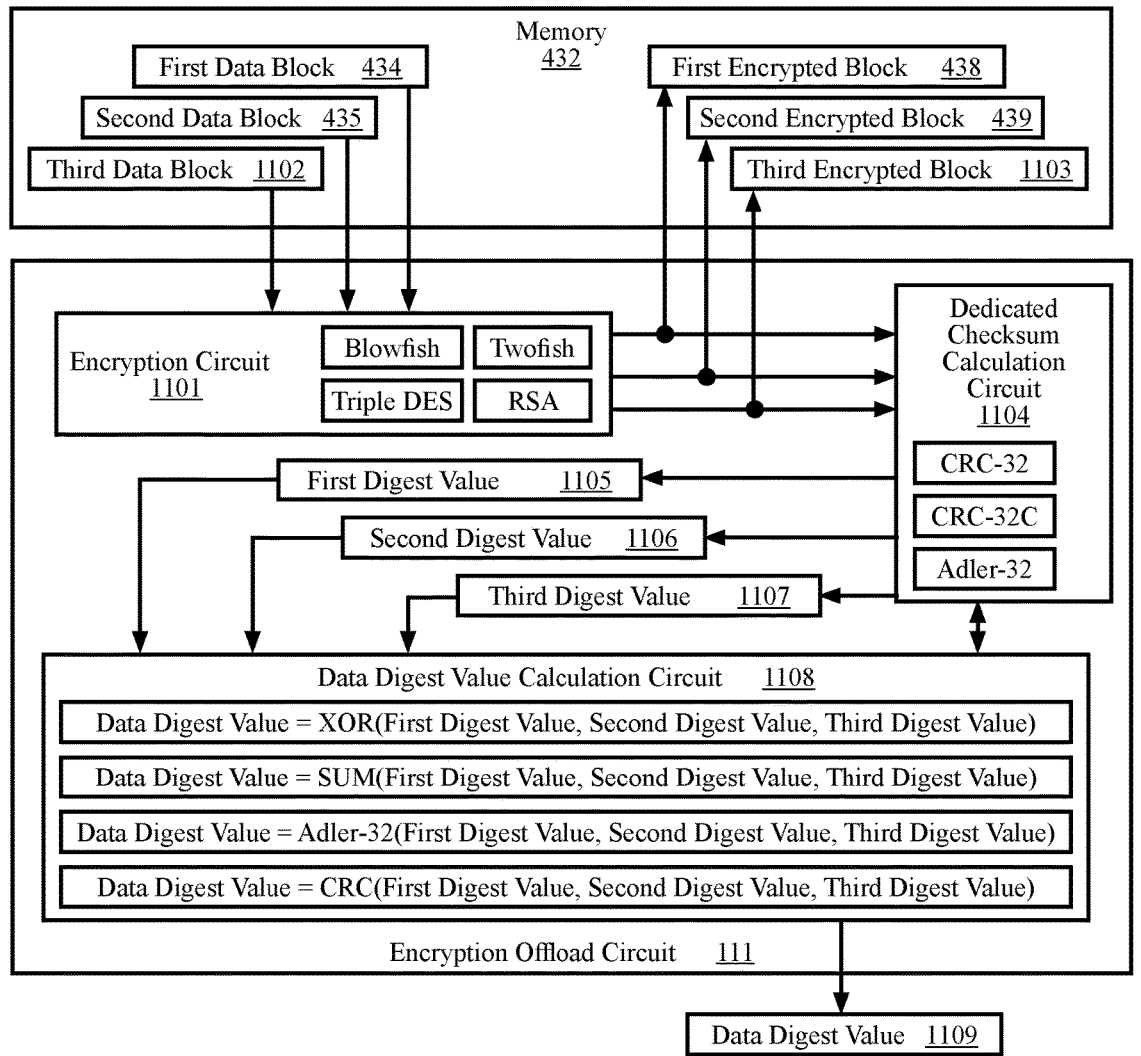
FIG. 11 is a high-level conceptual diagram illustrating the calculation of a data digest value according to some aspects.

FIG. 11 is a high-level conceptual diagram illustrating the calculation of a data digest value 1109 according to some aspects. A first data block 434, a second data block 435, and a third data block 1102 are stored in a memory 432. An encryption offload circuit 111 includes an encryption circuit 1101, a dedicated checksum calculation circuit 1104, and a data digest value calculation circuit 1108. In the example of FIG. 11, the dedicated checksum calculation circuit 1104 and the general use CRC calculation circuit 421 are two different circuits. The dedicated checksum calculation circuit 1104 can be or can include a dedicated CRC calculation circuit. In an alternative, the encryption offload circuit 111 and the general use CRC calculation circuit 421 may be configured such that the general use CRC calculation circuit 421 can receive the encrypted block directly from the encryption offload circuit 111. The encryption offload circuit 111 can read the first data block 434 and use the encryption circuit 1101 to produce the first encrypted block 438 by encrypting the first data block 434. The encryption circuit 1101 can send the first encrypted block 438 directly to the dedicated checksum calculation circuit 1104 for calculation of the first digest value 1105. The first digest value 1105 is a digest value for the first encrypted block 438. The encryption offload circuit 111 can also store the first encrypted block 438 in the memory. The encryption offload circuit 111 can similarly read the second data block 435, produce second encrypted block 439 by encrypting the second data block 435, and produce a second digest value 1106 that is a digest value for the second encrypted block 439. The encryption offload circuit 111 can also read the third data block 1102, produce the third encrypted block 1103 by encrypting the third data block 1102, and produce a third digest value 1107 that is a digest value for the third encrypted block 1103.

A packet, such as an NVMe/TCP PDU can include numerous encrypted blocks in its PDU data field. The data digest value of the NVMe/TCP PDU must be the digest value for the entire PDU data field. The data digest value calculation circuit 1108 can calculate a data digest value 1109 from the digest values for all the encrypted blocks in the PDU data field. In the example illustrated in FIG. 11, the data digest value calculation circuit 1108 calculates a data digest value 1109 from the first digest value 1105, the second digest value 1106, and the third digest value 1107. The data digest value 1109 can be an exclusive of the first digest value 1105, the second digest value 1106, and the third digest value 1107. The data digest value 1109 can be a sum of the first digest value 1105, the second digest value 1106, and the third digest value 1107. The data digest value 1109 can be an Adler-32 checksum of the first digest value 1105, the second digest value 1106, and the third digest value 1107. The data digest value 1109 can be a CRC checksum of the first digest value 1105, the second digest value 1106, and the third digest value 1107. The CRC checksum can be one of the notoriously well-known checksums such as the CRC-32 checksum or the CRC-32C checksum. With respect to CRC calculation circuits, those practiced in ASIC design are familiar with the licensing and integration of IP cores that can be included in ASICs to thereby implement a dedicated checksum calculation circuit in the ASIC. With respect to encryption circuits, those practiced in ASIC design are familiar with the licensing and integration of IP cores that can be included in ASICs to thereby implement an encryption circuit in the ASIC. Blowfish, twofish, triple DES, and RSA are notoriously well known and widely published encryption techniques.

Figure 12:
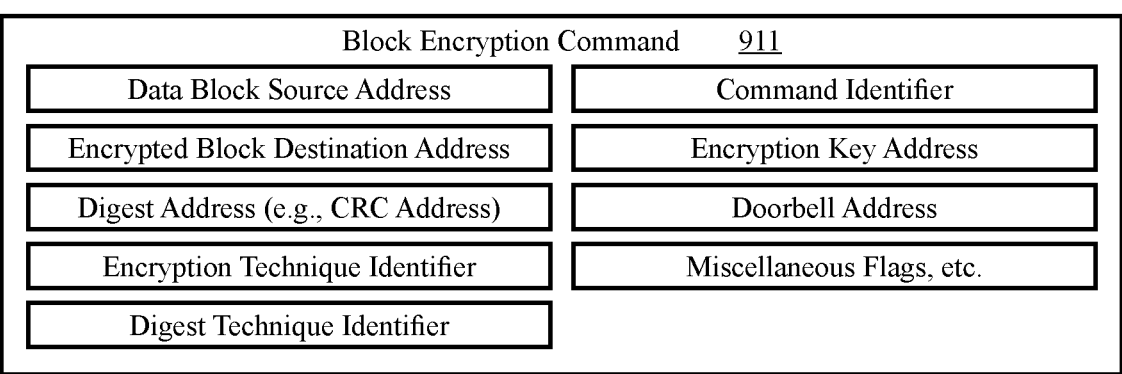
FIG. 12 is a high-level conceptual diagram illustrating a block encryption command according to some aspects.

FIG. 12 is a high-level conceptual diagram illustrating a block encryption command 911 according to some aspects. A packet processing pipeline circuit, a different CPU offload circuit, or a CPU core can send a block encryption command 911 to an encryption offload circuit 111 to thereby command the encryption offload circuit 111 to encrypt the first data block. The encryption offload may automatically produce digest values for encrypted blocks as an aspect of encrypting data blocks. The block encryption command can include a data block source address, an encrypted block destination address, a digest address, an encryption technique identifier, a digest technique identifier, a command identifier, an encryption key address, a doorbell address, and other data such as miscellaneous flags. The data block source address can be an address in memory from which to read the data block. The encrypted block destination address can be an address in memory to which the encrypted block is to be written. The digest address can be an address in memory to which the digest value for the encrypted block is to be written. The encryption technique identifier can be used to identify the specific encryption technique to be used to produce the encrypted block when the encryption circuit implements a variety of encryption techniques (e.g., blowfish, twofish, triple DES, RSA, etc.). The digest technique identifier can be used to identify the specific digest calculation technique to be used to produce the digest value when the dedicated checksum calculation circuit implements a variety of checksum calculation techniques (e.g., CRC-32, CRC-32C, Adler-32, etc.). The command identifier can identify the block encryption command. The encryption key address can be an address in memory at which an encryption key is located. The encryption circuit can use the encryption key for encrypting the data block. The doorbell address can be the address of a doorbell. When the processing for the block encryption command is complete, a value such as the command identifier may be written to the doorbell to thereby inform a scheduler that the encrypted block and the digest value are available.

Figure 13:
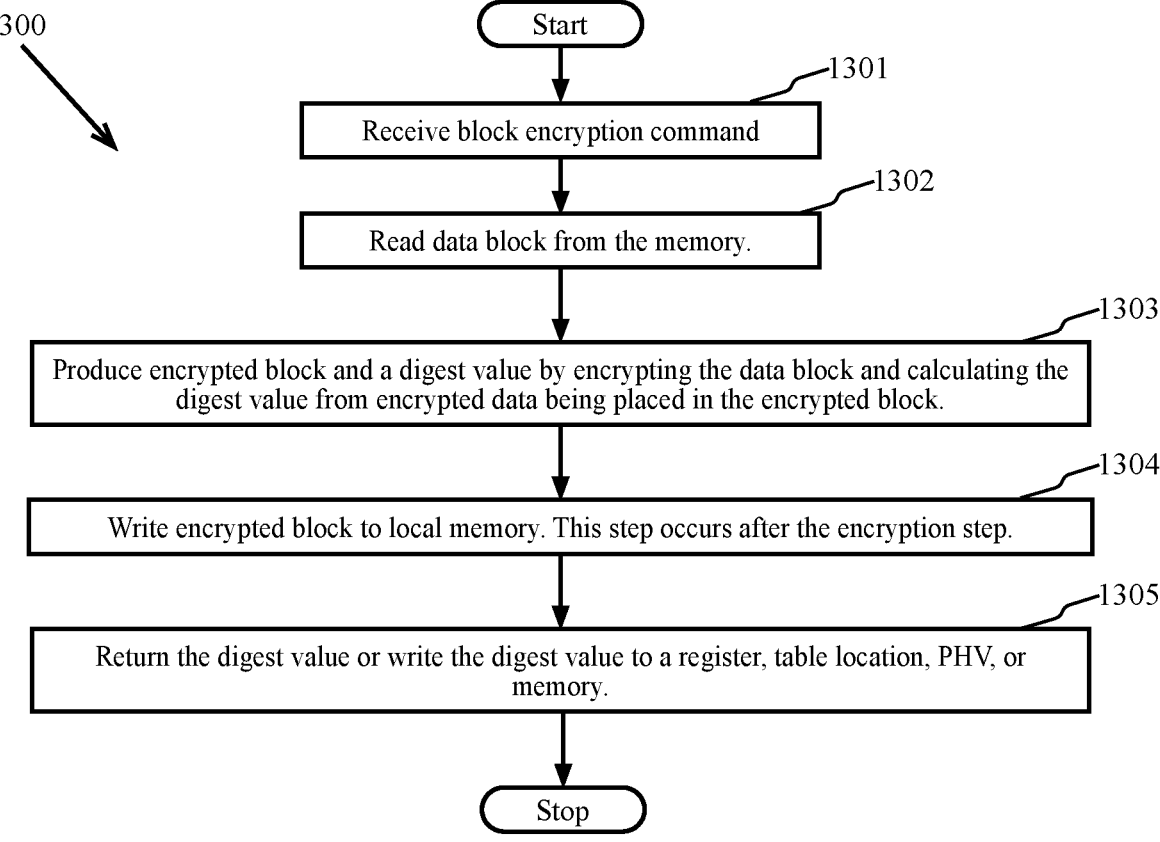
FIG. 13 is a high-level flow diagram illustrating a process that may be performed by an encryption offload circuit for producing an encrypted block and calculating a block data digest value according to some aspects.

FIG. 13 is a high-level flow diagram illustrating a process 1300 that may be performed by an encryption offload circuit for producing an encrypted block and calculating a block data digest value according to some aspects. After the start, at block 1301 a block encryption command is received. At block 1302, the data block is read from the memory. At block 1303, the encryption offload circuit can produce an encrypted block and a digest value by encrypting the data block and calculating digest value from encrypted data being placed in the encrypted block. At block 1304, the encryption offload circuit can write the encrypted block to the memory. Block 1304 is performed after block 1303 is complete. At block 1305, the encryption offload circuit can return the digest value or write the digest value to a register, table location, PHV, or memory.

FIG. 14 is a high-level flow diagram illustrating a method 1400 for NVMe PDU data digest optimization according to some aspects. After the start, at block 1401 the method can store a plurality of data blocks that includes a first data block in a memory. At block 1402, the method can use an encryption offload circuit to produce a first encrypted block and a first digest value from a first read of the first data block from the memory. At block 1403, the method can produce a network packet that includes the first encrypted block and a data digest value, wherein the first digest value is used to produce the data digest value, wherein the encryption offload circuit is configured to produce a plurality of encrypted blocks by encrypting the data blocks, and wherein the encryption offload circuit is configured to use the data blocks to calculate a plurality of digest values.

FIG. 15 is a high-level flow diagram illustrating a method 1500 for producing a network packet carrying an NVMe PDU that includes two encrypted blocks according to some aspects. After the start, at block 1501, the method can read a data block from a memory. This is the first read of the data block from the memory. Only a single read, this first read, of the data block is used for producing the encrypted block and the digest value at other steps. At block 1502, the method can produce a first encrypted block by using an encryption offload circuit to encrypt the first data block. At block 1503, the method can calculate, by the encryption offload circuit, a first digest value for the first encrypted block. At block 1504, the method can read a second data block from the memory. At block 1505, the method can produce a second encrypted block by using the encryption offload circuit to encrypt the second data block. At block 1506, the method can calculate, by the encryption offload circuit, a second digest value for the second encrypted block. At block 1507, the method can produce a network packet that includes the first encrypted block, the second encrypted block, and a data digest value, wherein the first digest value and the second digest value are used to produce the data digest value, only one read of the first data block from the memory is performed for producing the first encrypted block and also for calculating the first digest value, and only one read of the second data block from the memory is performed for producing the second encrypted block and also for calculating the second digest value.

Aspects described above can be ultimately implemented in a network appliance that includes physical circuits that implement digital data processing, storage, and communi-cations. The network appliance can include processing cir-cuits, ROM, RAM, TCAM, and at least one interface (interface(s)). The CPU cores described above are imple-mented in processing circuits and memory that is integrated into the same integrated circuit (IC) device as ASIC circuits and memory that are used to implement the programmable packet processing pipeline. For example, the CPU cores and ASIC circuits are fabricated on the same semiconductor substrate to form a System-on-Chip (SoC). The network appliance may be embodied as a single IC device (e.g., fabricated on a single substrate) or the network appliance may be embodied as a system that includes multiple IC devices connected by, for example, a printed circuit board (PCB). The interfaces may include network interfaces (e.g., Ethernet interfaces and/or InfiniBand interfaces) and/or PCIe interfaces. The interfaces may also include other management and control interfaces such as I2C, general purpose IOs, USB, UART, SPI, and eMMC.

Although the operations of the method(s) herein are shown and described in a particular order, the order of the operations of each method may be altered so that certain operations may be performed in an inverse order or so that certain operations may be performed, at least in part, con-currently with other operations. Instructions or sub-opera-tions of distinct operations may be implemented in an intermittent and/or alternating manner.

It should also be noted that at least some of the operations for the methods described herein may be implemented using software instructions stored on a computer usable storage medium for execution by a computer. As an example, an embodiment of a computer program product includes a computer usable storage medium to store a computer read-able program.

The computer-usable or computer-readable storage medium can be an electronic, magnetic, optical, electromag-netic, infrared, or semiconductor system (or apparatus or device). Examples of non-transitory computer-usable and computer-readable storage media include a semiconductor or solid-state memory, magnetic tape, a removable computer diskette, a random-access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A network appliance comprising:
a memory that stores a plurality of data blocks that includes a first data block; and
an encryption offload circuit configured to produce encrypted blocks and digest values of the encrypted blocks,
wherein an encryption circuit in the encryption offload circuit is configured to produce encrypted data in response to receiving the first data block,
wherein a digest calculation circuit is configured to pro-duce a first digest value in response to receiving the encrypted data directly from the encryption circuit,
wherein the encryption offload circuit stores a first encrypted block by writing the encrypted data to the memory, wherein the network appliance is configured to produce a network packet that includes the first encrypted block and a data digest value produced using the first digest value.

2. The network appliance of claim 1, further including:
a semiconductor chip that includes a memory interface and an on-chip communications fabric;
wherein the memory is outside of the semiconductor chip;
wherein the memory interface is configured to read from and write to the memory;
wherein the on-chip communications fabric communicatively connects the memory interface with the encryption offload circuit;
wherein the semiconductor chip receives the first data block from the memory via the memory interface; and
wherein the encryption offload circuit receives the first data block via the on-chip communications fabric.

3. The network appliance of claim 1, wherein:
a network interface card (NIC) includes the encryption offload circuit and the memory;
the NIC is installed in a host computer that includes a host memory; and
the NIC uses a peripheral component interface express (PCIe) bus to transfer the first data block from the host memory to the memory.

4. The network appliance of claim 1, further including:
a packet processing pipeline circuit that commands the encryption offload circuit to encrypt the first data block.

5. The network appliance of claim 1 wherein:
the network packet includes a Non-Volatile Memory Express (NVMe) protocol data unit (PDU);
a PDU data field of the NVMe PDU includes the first encrypted block; and
a data digest field of the NVMe PDU includes the data digest value.

6. The network appliance of claim 5 wherein:
the network packet is an internet protocol (IP) packet that encapsulates a transmission control protocol (TCP) packet; and
the NVMe PDU is a NVMe/TCP PDU that is included in a TCP payload of the TCP packet.

7. The network appliance of claim 1 wherein:
the network packet is an IP packet that encapsulates a TCP packet that includes a TCP payload;
the TCP payload includes a NVMe/TCP PDU that has a PDU data field and a data digest field;
the PDU data field includes the first encrypted block; and
the data digest field includes the data digest value.

8. The network appliance of claim 1 wherein:
the network packet is an IP packet that includes an IP payload;
the IP payload includes a NVMe/TCP PDU that has a PDU data field and a data digest field;
the PDU data field includes the first encrypted block; and
the data digest field includes the data digest value.

9. The network appliance of claim 1, wherein:
the plurality of data blocks includes a second data block;
a second encrypted block and a second digest value are produced by the encryption offload circuit;
the network packet includes the second encrypted block; and
the first digest value and the second digest value are used to produce the data digest value.

10. The network appliance of claim 9 wherein:
the first digest value is a first cyclic redundancy check (CRC) value;
the second digest value is a second CRC value; and an exclusive or (XOR) circuit uses the first CRC value and the second CRC value to produce the data digest value.

11. The network appliance of claim 9 wherein:
the first digest value is a first cyclic redundancy check (CRC) value;
the second digest value is a second CRC value; and
a checksum circuit uses the first CRC value and the second CRC value to produce the data digest value.

12. The network appliance of claim 9 wherein:
the first digest value is a first cyclic redundancy check (CRC) value;
the second digest value is a second CRC value; and
a summation circuit uses the first CRC value and the second CRC value to produce the data digest value.

13. The network appliance of claim 9 wherein:
the first digest value is a first cyclic redundancy check (CRC) value;
the second digest value is a second CRC value; and
an Adler-32 circuit uses the first CRC value and the second CRC value to produce the data digest value.

14. The network appliance of claim 9 wherein:
the first digest value is a first cyclic redundancy check (CRC) value;
the second digest value is a second CRC value; and
a CRC circuit produces the data digest value by using the first CRC value and the second CRC value as inputs.

15. The network appliance of claim 14, further including:
a semiconductor chip that includes the encryption offload circuit, a memory interface, a packet processing pipeline circuit, and an on-chip communications fabric,
wherein
the memory is outside of the semiconductor chip,
the memory interface is configured to read from and write to the memory,
the on-chip communications fabric communicatively connects the memory interface with the encryption offload circuit,
the semiconductor chip receives the first data block from the memory via the memory interface,
the encryption offload circuit receives the first data block via the on-chip communications fabric,
a NIC includes the semiconductor chip and the memory,
the NIC is installed in a host computer that includes a host memory,
the NIC uses a PCIe bus to transfer the first data block from the host memory to the memory,
the packet processing pipeline circuit commands the encryption offload circuit to encrypt the first data block,
the network packet includes a NVMe PDU,
a PDU data field of the NVMe PDU includes the first encrypted block,
a data digest field of the NVMe PDU includes the data digest value,
the network packet is an IP packet that encapsulates a TCP packet that includes a TCP payload, and
the NVMe PDU is a NVMe/TCP PDU that is included in the TCP payload.

16. A method comprising:
storing a plurality of data blocks that includes a first data block in a memory;
producing a first encrypted block and a first digest value in response to receiving the first data block; and
producing a network packet that includes the first encrypted block and a data digest value produced using the first digest value, wherein an encryption circuit is configured to produce encrypted data in response to receiving the first data block, wherein the first digest value is produced in response to receiving the encrypted data directly from the encryption circuit, and wherein the first encrypted block is stored by writing the encrypted data to the memory.

17. The method of claim 16, wherein:

the network packet includes a NVMe PDU;

a PDU data field of the NVMe PDU includes the first encrypted block; and a data digest field of the NVMe PDU includes the data digest value.

18. The method of claim 16, further including:

producing a second encrypted block and a second digest value in response to receiving a second data block, wherein:

the network packet includes the second encrypted block; and the first digest value and the second digest value are used to produce the data digest value.

19. A system comprising:

a memory means for storing a plurality of data blocks that includes a first data block;

an encryption means for producing encrypted data in response to receiving the data blocks;

a digest means for producing a plurality of digest values in response to receiving the encrypted data directly from the encryption means;

a means for storing encrypted blocks by storing the encrypted data in the memory means;

a means for using the digest values to produce a data digest value; and a means for producing a network packet that includes at least one of the encrypted blocks and the data digest value.

20. The system of claim 19, wherein:

the network packet includes a NVMe PDU;

a PDU data field of the NVMe PDU includes the encrypted blocks; and a data digest field of the NVMe PDU includes the data digest value.

\* \* \* \* \*